(12) United States Patent
Hoffmann et al.

(10) Patent No.: US 12,307,832 B2
(45) Date of Patent: May 20, 2025

(54) EVALUATION AND TRANSMISSION OF COMBINED EXTERNAL DATA FROM ONE OR MORE ASSETS TO A CENTRAL DATA PORTAL FOR STORAGE AND VISUALIZATION

(71) Applicant: HDWB, LLC, El Paso, TX (US)

(72) Inventors: Eric William Hoffmann, Saint Francis, WI (US); John Myrl Warren, El Paso, TX (US)

(73) Assignee: HDWB, LLC, El Paso, TX (US)

( * ) Notice: Subject to any disclaimer, the term of this patent is extended or adjusted under 35 U.S.C. 154(b) by 49 days.

(21) Appl. No.: 18/367,373

(22) Filed: Sep. 12, 2023

(65) Prior Publication Data
US 2024/0005705 A1 Jan. 4, 2024

Related U.S. Application Data

(63) Continuation-in-part of application No. 17/360,335, filed on Jun. 28, 2021, now Pat. No. 11,756,343, which is a continuation-in-part of application No. 16/513,738, filed on Jul. 17, 2019, now Pat. No. 11,057,688.

(60) Provisional application No. 62/700,532, filed on Jul. 19, 2018.

(51) Int. Cl.
*G07C 5/00* (2006.01)
*H04L 67/12* (2022.01)

(52) U.S. Cl.
CPC .............. *G07C 5/008* (2013.01); *H04L 67/12* (2013.01)

(58) Field of Classification Search
CPC .. G07C 5/008; G07C 9/00309; G07C 5/0808; H04L 67/12; H04Q 9/00; H04Q 2209/10; H04Q 2209/40; H04Q 2209/50; H04W 4/023; H04W 4/029; H04W 4/38
See application file for complete search history.

(56) References Cited

U.S. PATENT DOCUMENTS

| | | | |
|---|---|---|---|
| 2013/0194066 A1* | 8/2013 | Rahman | G05B 1/01 340/5.51 |
| 2015/0358444 A1* | 12/2015 | Mercando | A44C 9/0053 455/566 |
| 2016/0143079 A1* | 5/2016 | Yoon | H04W 8/005 455/41.1 |
| 2017/0155427 A1* | 6/2017 | Hasan | G16H 40/67 |
| 2018/0068553 A1* | 3/2018 | Amir | G08B 25/004 |
| 2018/0190017 A1* | 7/2018 | Mendez | G06T 17/20 |
| 2018/0290020 A1* | 10/2018 | Vissa | H04L 67/52 |

(Continued)

*Primary Examiner* — Amine Benlagsir
(74) *Attorney, Agent, or Firm* — Georgiy L. Khayet

(57) ABSTRACT

Systems and methods for evaluating and transmitting combined external data from one or more assets are described herein. An example method may include collecting, by a data processing device communicatively coupled to a central data portal, sensor data from one or more assets, processing, by the data processing device, the sensor data to evaluate status data concerning a status of the one or more assets, where the evaluation of the status data is enabled or disabled based on a predefined criterion for a proximity of a first asset of the one or more assets and a second asset of the one or more assets, transmitting, by the data processing device, the status data to the central data portal, and storing and visualizing, by the central data portal, the status data.

17 Claims, 18 Drawing Sheets

(56) References Cited

U.S. PATENT DOCUMENTS

2019/0172015 A1* 6/2019 Hamby ................ G06Q 10/109
2019/0385458 A1* 12/2019 Garrett ................... G08G 1/164

* cited by examiner

EVALUATION AND TRANSMISSION OF COMBINED EXTERNAL DATA FROM ONE OR MORE ASSETS TO A CENTRAL DATA PORTAL FOR STORAGE AND VISUALIZATION

CROSS-REFERENCE TO RELATED APPLICATIONS

This application is a Continuation-in-Part of U.S. application Ser. No. 17/360,335 filed on Jun. 28, 2021, and entitled "Evaluating and transmitting combined external data from one or more assets to a central data portal for storage and visualization," which in turn is a Continuation-in-Part of U.S. application Ser. No. 16/513,738 filed on Jul. 17, 2019, and entitled "Methods and systems for evaluating and transmitting combined external data from one or more sources to a central data portal for processing, storage, and visualization," which claims benefit of and priority of U.S. Provisional Patent Application No. 62/700,532 filed on Jul. 19, 2018, and entitled "Methods and system for the evaluation and transmission of combined external data from one or more sources to a central data portal for processing, storage, and visualization." The subject matter of the aforementioned applications is incorporated herein by reference in its entirety.

TECHNICAL FIELD

The present disclosure relates generally to data processing and, more specifically, to evaluating and transmitting combined external data from one or more assets to a central data portal for storage and visualization.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Existing systems for the transmission of external data are employed independently of each other and, therefore, are limited in their ability to collect or combine information from different and multiple data sources for transmission and evaluation using a single data transmission source.

Existing systems operating in the telemetry space are also constrained by limited modes or limited combinations of modes for data transmission. These limitations can prevent combining data from different multiple sources at a single data portal for the processing, storage and visualization of the data. Thus, data related to persons, vehicles, machineries, assets, buildings or external environments are treated as separate entities during processing, storing, and visualization while aggregated at a centralized data portal.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer-implemented systems and methods for evaluating and transmitting combined external data from one or more assets to a central data portal. According to one example embodiment, a system for evaluating and transmitting combined external data from one or more assets is provided. The system may include a central data portal and a data processing device communicatively coupled to a central data portal. The data processing device can be configured to collect sensor data from the one or more assets. The data processing device may process the sensor data to evaluate status data concerning states of the one or more assets. The evaluation of the status data may be enabled or disabled based on a predefined criterion for a proximity of a first asset of the one or more assets and a second asset of the one or more assets. The data processing device may transmit the status data to the central data portal. The central data portal can be configured to store and visualize the status data.

The evaluation of a status of a first asset of the assets can be partially based on sensor data collected from a second asset of the assets, where the second asset is different from the first asset.

The sensor data can be transmitted between the assets and the data processing device via one or more wired communication channels. The sensor data are transmitted between the assets and the data processing device via one or more wireless communication channels.

The assets may include one or more of a building, a room, an outdoor location, a vehicle, a person, a wearable device worn by the person, an electronic device, and a facility. The data processing device can include a personal computer, a tablet computer, a smartphone, a smartwatch, an electronic wearable device, a server, an electronic processing device, and a handheld microprocessor device associated with a person. The data processing device can be configured to determine, based on the sensor data, a relationship between the one or more assets. The relationship may include one or more of the following: a proximity of an asset of the one or more assets to at least one other asset of the one or more assets, presence of the asset in the at least one other asset, position of the asset with respect to the at least one other asset, movements of the asset with respect to the at least one other asset, and distance between the asset and the at least one other asset.

The data processing device can be configured to determine, based on the sensor data, a status concerning a state of panic of the person. The data processing device can be configured to determine, based on the sensor data, status concerning an impact imposed on the person. The data processing device can be configured to determine, based on the sensor data, a status concerning non-responsiveness of the person. The data processing device can be configured to determine, based on the sensor data, a status concerning a physical orientation of the person. The data processing device can be configured to determine, based on the sensor data, a status concerning a presence of a gunshot in a proximity of the person. The data processing device can be configured to determine, based on the sensor data, a status concerning an actuated operational state, performance, and diagnostics of the vehicle.

The data processing device can be configured to determine or actuate, based on the sensor data, a status concerning a building or a room. The status concerning the building or the room may include at least one or more of the following: the room is unlocked, the room is locked, a window is opened, a window is closed, a temperature of the room is higher a pre-determined temperature threshold, a smoke detector alarm, a gas detector alarm, a fire detector alarm, a humidity level being outside of a pre-determined humidity range, an air quality level being outside of a pre-determined air quality range, a gunshot is detected, a window glass is broken, a door is impacted, and a wall is impacted.

The data processing device can be configured to determine, based on the sensor data, a status concerning the outdoor location. The status concerning the outdoor location may include at least one or more of the following: a humidity level at the outdoor location is outside of a pre-determined humidity range, an air temperature at the outdoor location is outside of a pre-determined temperature range, an air quality level at the outdoor location is outside of a pre-determined air quality range, a gunshot is detected at the outdoor location, a smoke detector at the outdoor location is set off, and a gas detector at the outdoor location is set off.

According to another example embodiment, a method for evaluating and transmitting combined external data from one or more assets is provided. The method may include collecting, by a data processing device communicatively coupled to a central data portal, sensor data from one or more assets. The method may include processing, by the data processing device, the sensor data to evaluate status data concerning statuses of the assets. The evaluation of the status data may be enabled or disabled based on a predefined criterion for a proximity of a first asset of the one or more assets and a second asset of the one or more assets. The method may include transmitting, by the data processing device, the status data to the central data portal. The method may include storing and visualizing, by the central data portal, the status data.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
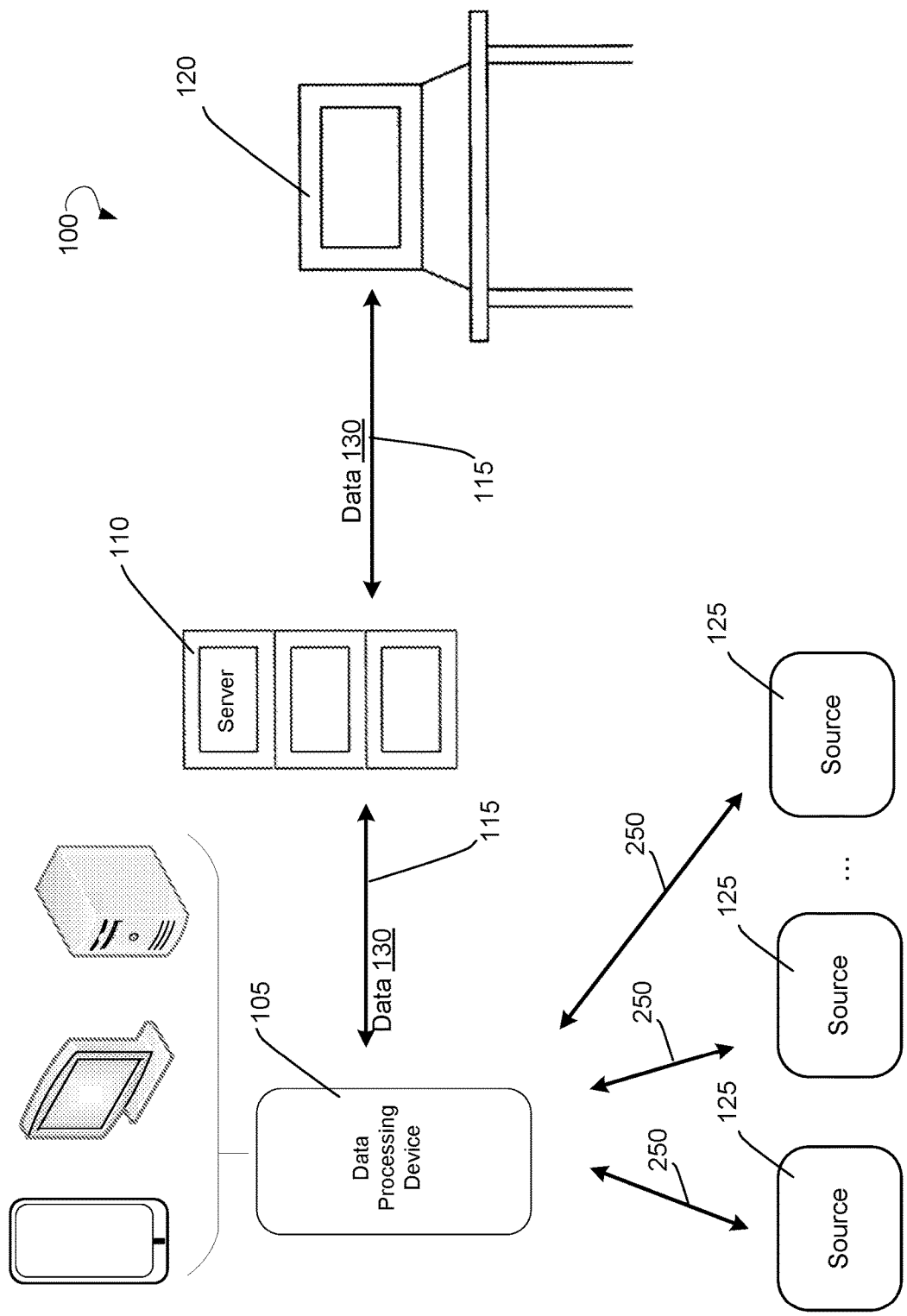
FIG. 1 illustrates an environment within which methods and systems for evaluating and transmitting combined external data from one or more assets to a central data portal can be implemented.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure is directed to systems and methods for evaluating and transmitting combined external data from one or more assets to a central data portal for storage and visualization. Some embodiments of the present disclosure may allow collecting, processing, and combining information from various and multiple assets, i.e., multiple data sources, to be transmitted to a central data portal via a single data processing device. The data processing device can be co-located with one or more of the assets. The assets from which information is collected may include persons, vehicles, machinery, buildings, outdoor locations, facilities, electronic devices, sensors, and so forth. The information can be evaluated by methods that combine information from multiple data sources. Embodiments of the present disclosure may further aggregate data from these various assets for storage and visualization on a central data portal and for further processing. Embodiments of the present disclosure may also provide one or more modes for transferring the data to the central data portal.

One of the main differences between the technology disclosed herein and existing technologies is the ability to combine information collected from various and multiple assets and transfer the data to a central data portal. The information collected from various multiple assets can be processed and used by advanced evaluation methods to enhance system features and create new features that are not possible within the constraints of the existing technologies.

Modes of data transmission described herein are not limited to the data transmission used by existing technologies. Embodiments of the present disclosure may enhance the ability to monitor personnel both indoor and outdoor. Some embodiments of the present disclosure may allow unifying data collected from various assets and, thereby, provide efficacy and cost savings by eliminating the need for multiple data transmission devices.

Existing systems can be designed to take data from a single type of asset whether it be a person, vehicle, building, or environment, process the data, and then transfer the processed data to a portal for storage and visualization. The processing of the data at the data processing device and storage and visualization of data at the portal are based on the relevancy of the single asset. The existing methods in which the data from an asset is evaluated are also limited to the data collected from the asset.

Limiting the transmission of data to a single source system requires users to access multiple single-source systems in order to review data from all sources (i.e., assets). This separation of data limits the ability to effectively process data from multiple sources for advanced methods. Such systems are further limited in their inability to collect and evaluate data from various sources from a single device, resulting in the need to have multiple devices with redundant capabilities evaluate and transmit data.

Some embodiments of the present disclosure may provide visibility to information obtained from various assets and aggregated at a single data portal. Furthermore, the data from various assets can be evaluated and transmitted using a single processing device. Thus, embodiments of the present disclosure may allow eliminating the need for multiple systems using multiple devices to evaluate the assets. Embodiments of the present disclosure may also provide advanced algorithms that can depend on data from multiple assets. Therefore, systems and methods disclosed herein can analyze, using aggregated asset information and evaluation, the following functionalities: impact, panic, physical orientation, responsiveness, monitoring indoor and outdoor, vehicle prognostics, vehicle diagnostics, vehicle monitoring, building monitoring and access, environmental monitoring, asset monitoring, gunshot detection, location monitoring, facility monitoring, vehicle monitoring, and biometrics.

According to some embodiments of the present disclosure, a system for evaluating and transmitting combined external data from one or more assets to a central data portal may include a processing device (for example, a smart phone) and a software application running on the data processing device. The data processing device may collect sensor data from multiple assets for evaluation. The data processing device may then process the collected data and send the processed data to a central data portal via wireless radio frequency (RF) communication or, optionally, by a secondary RF communication device. The secondary RF communication device can be used when the standard frequencies of the data processing device are not sufficient to transmit the data over a distance.

The data processing device may act as a standalone edge computing device configured to collect and analyze the data without further need for analyzing the data at the central data portal.

The data processing device may include a personal computer, a tablet computer, a laptop, a smartphone, a smartwatch, an electronic wearable device, a server, an electronic processing device, a handheld microprocessor device associated with a person, and so forth. The central data portal may include a computer with processing capabilities, memory, storage, and internet connection. The central data portal may have, for example, a cloud architecture or a local architecture, i.e., may be part of a cloud network or a local network. In an example embodiment, the central data portal may include an application or a platform running on a server. Software programming on the central data portal can be required to receive data from the data processing device, store, post process (e.g., when a specific storage format is needed), and deliver data to a user interface portal, also referred herein to as a web portal. To provide further enhancement to the evaluation and processing of data, additional devices can be used to collect data from a different source and then send the collected data to the data processing device and then to the central data portal.

Some embodiments of the present disclosure may allow equipping personnel with processing devices, such as handheld microprocessor devices, which monitors sensors inherent to the data processing devices and sensors of devices connected to the data processing devices. The connected devices may monitor other assets, such as other personnel, vehicles, indoor environments and outdoor environments (e.g., a navy ship, a building yard, an oil field, a gas field, and a mine), and so forth. Sensor data can be collected for all entities, processed, and sent through applicable transmission methods to the central data portal. The data processing device may be configured to process the sensor data and determine, based on the sensor data, a relationship between the one or more assets. The relationship may include one or more of the following: a proximity of an asset to at least one other asset, a presence of the asset in the at least one other asset, a position of the asset with respect to the at least one other asset, movements of the asset with respect to the at least one other asset, a distance between the asset and the at least one other asset, and so forth. The data processing device associated with any asset (e.g., a person, a vehicle, and a building) may act as a standalone edge computing device configured to collect and analyze the data without further need for analyzing the data at the central data portal. All collected data can be optionally post-processed and displayed by the central data portal via a user interface on a web portal.

Embodiments of the present disclosure may allow aggregation of data collected from multiple assets at a central data portal for visualization. This may allow avoiding using multiple monitoring systems for mixed fleet of different sources. The data collected by the central data portal can be used by web portal users for the following applications: general telemetry practices, safety monitoring and planning, dispatching, vehicle fleet monitoring and maintenance, emergency response and preparedness, asset monitoring, building monitoring and control, hospitality worker panic safety, indoor positioning, gunshot detection and shooter positioning, and building access.

Referring now to the drawings, FIG. 1 illustrates an environment 100 within which methods and systems for evaluating and transmitting combined external data from one or more assets to a central data portal can be implemented. The environment 100 may include a data processing device 105, a central data portal 110, a user interface portal 120, and one or more connected sources 125.

In some embodiments, the data processing device 105 may include any electronic processing device, such as a computer, a handheld microprocessor device, a smartphone, a tablet computer, a server, and so forth. The data processing device 105 may receive data from one or more sources 125. The sources 125 may include assets. In an example embodiment, one or more sensors may be connected to the assets. In a further example embodiment, the assets may include sensors. The assets may include buildings, rooms of the buildings, outdoor locations, vehicles, people, and so forth. Each of the assets may include sensors, processors, actuators, and communication interface. The sources 125 can be connected to the data processing device 105 by one or more communication channels 250 including but not limited to wireless methods of connectivity such as cellular connections, 4G connection, 5G connection, two-way radio connection, Wi-Fi™, Bluetooth™, near field communication (NFC), Satellite, ZigBee, microwave, infrared, or other protocols of wireless radio frequency (RF) connections.

The data processing device 105 may include sensors. Furthermore, the data processing device 105 may be configured to evaluate and process data received from the sensors and connected assets. The data processing device 105 may further determine, based on the sensor data, a relationship between the one or more assets. The relationship may include one or more of the following: a proximity of an asset of the one or more assets to at least one other asset of the one or more assets, presence of the asset in the at least one other asset, position of the asset with respect to the at least one other asset, movements of the asset with respect to the at least one other asset, distance between the asset and the at least one other asset, and so forth.

The data processing device 105 may send processed data 130 to the central data portal 110 via a communication channel 115. The communication channel 115 may be selected from a cellular data communication channel, a two-way radio data communication channel, Wi-Fi™, Bluetooth™, NFC, a satellite data communication channel, Ethernet, ZigBee, microwave, infrared, or other forms of wireless RF or wired data transmission. The data processing device 105 can be equipped with electronics for the transmission of data via any single mode or any combination of modes of data transfer, or any combination of cellular, two-way radio, Wi-Fi™, Bluetooth™, NFC, satellite, Ethernet, ZigBee, microwave, infrared, or other forms of wireless RF transmission or wired data transmission.

The central data portal 110 may include one or more servers and/or cloud based computational resources. The central data portal 110 may store the data 130 received from the data processing device 105. The user interface portal 120 may include a personal computer, a tablet computer, a smartphone, and so forth. The user interface portal 120 can retrieve stored data 130 from the central data portal 110 and send the data 130 to further devices or systems for further processing and/or storage.

Figure 2:
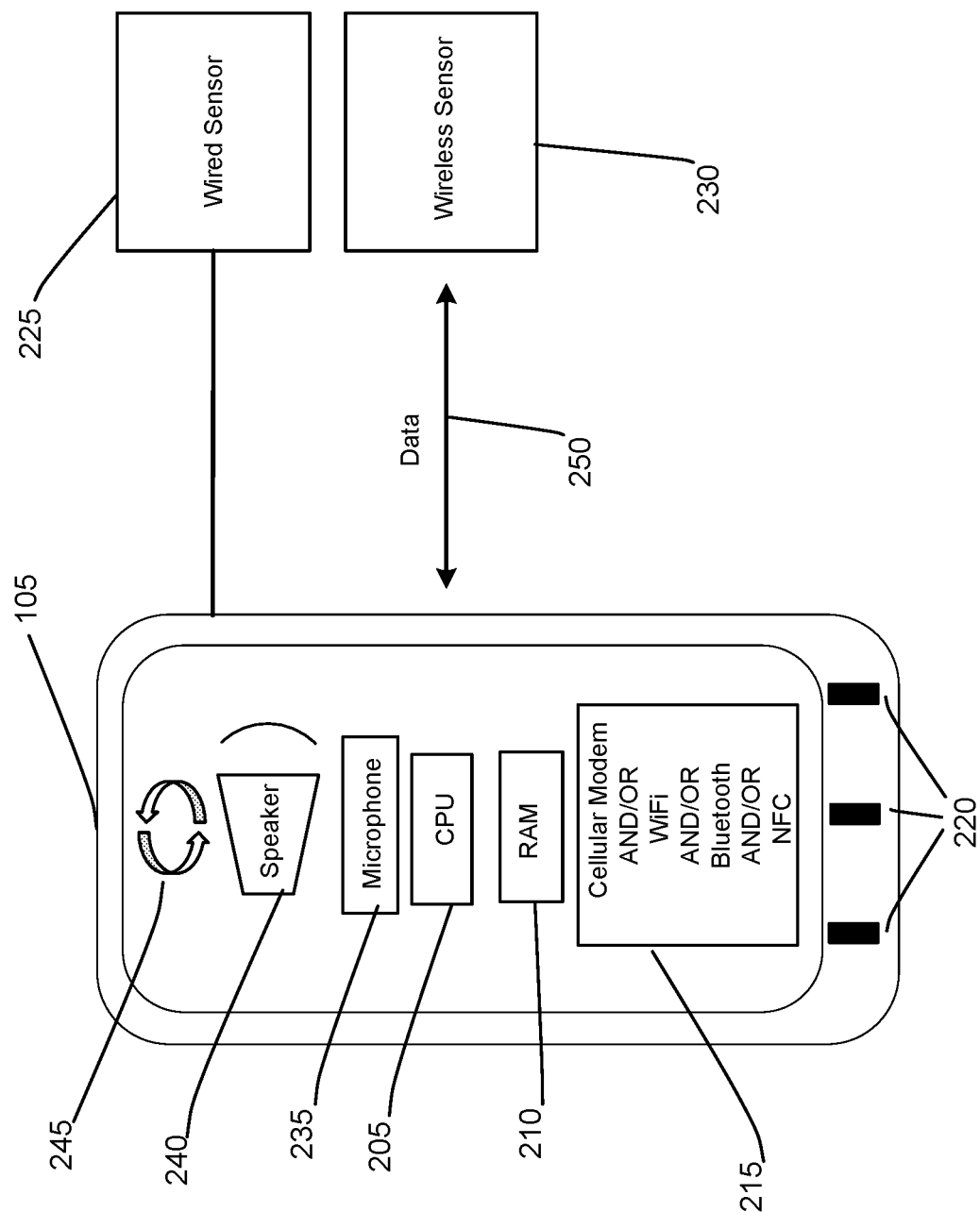
FIG. 2 is a block diagram showing an example data processing device, according to an example embodiment.

FIG. 2 is a block diagram showing an example data processing device 105, according to an example embodiment. The data processing device 105 can include a central processing unit 205 for evaluating data, memory 210 for locally storing data, and an RF transmission module 215 for sending and rescinding data with the central data portal 110 (shown in FIG. 1).

The data processing device 105 can include sensors. The sensors may include sensors 220 fixed on the data processing device 105. The sensors may include remote sensors 225 connected to the data processing device 105 via a wired connection. The sensors may also include sensors 230 connected to the data processing device 105 via a wireless communication channels 250, such as cellular, two-way radio, Wi-Fi™, Bluetooth™, NFC, Satellite, ZigBee, microwave, infrared, or other forms of wireless RF connection. The sensors 220 fixed on the data processing device 105 may include but are not limited to buttons, fingerprint sensor, temperature sensor, pressure sensor, light sensor, camera, and touch screen.

The data processing device 105 may include a microphone 235, speaker 240, and a movement sensor 245. The movement sensor may include an accelerometer and/or a gyroscope. The data processing device 105 can be connected wirelessly to one or more of assets, such as buildings, rooms, person, vehicles, facilities, outdoor locations, and so forth. The data processing device 105 can also be communicatively connected with wearable devices being worn by one or more persons.

Figure 3:
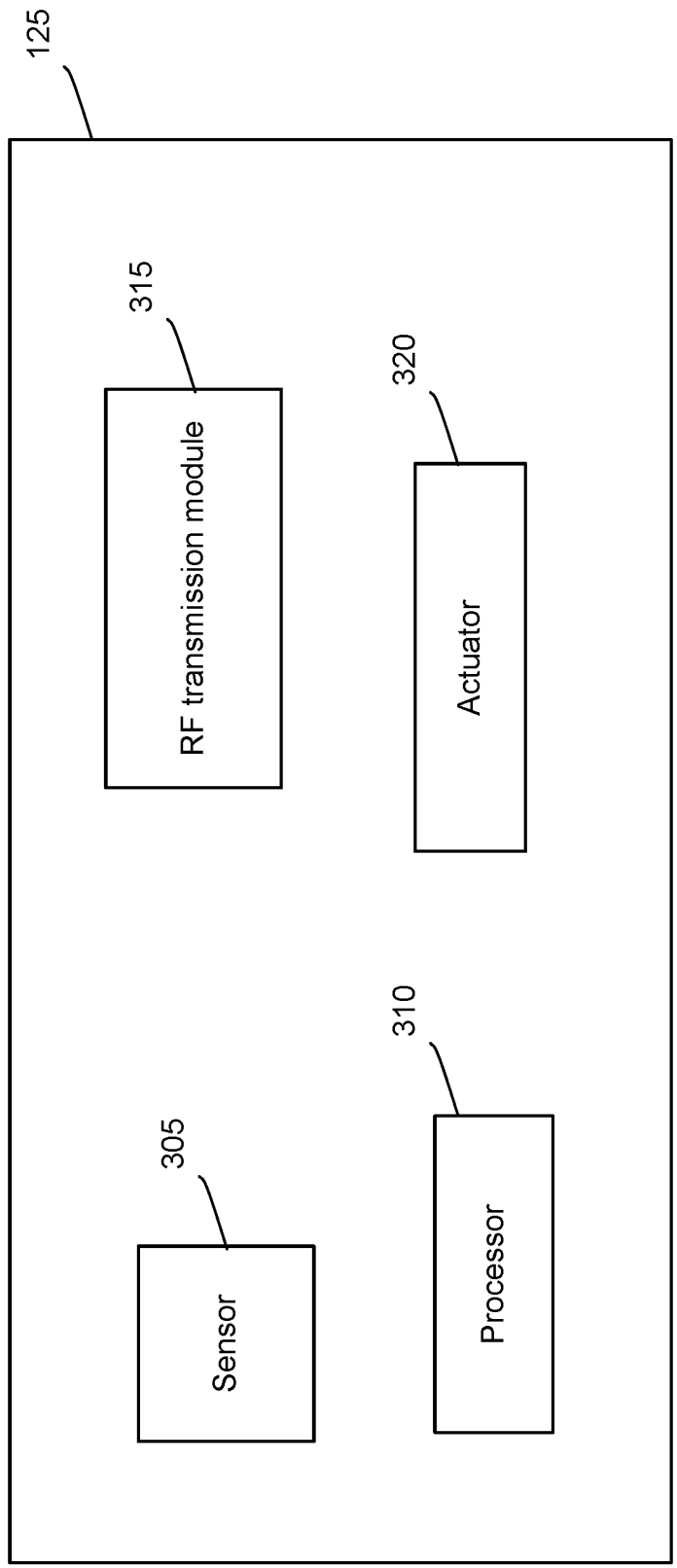
FIG. 3 is a block diagram showing assets, according to an example embodiment.

FIG. 3 is a block diagram showing a source 125, according to an example embodiment. The source 125 may include an asset. The source 125 may include a sensor 305, a processor 310, an RF transmission module 315, and actuator 320. The source 125 may be configured to collect data and transmit data to the data processing device 105 and receive data from the data processing device 105. The data between the source 125 and the data processing device 105 can be transmitted wirelessly by communication channels 250 (shown in FIG. 1).

Figure 4:
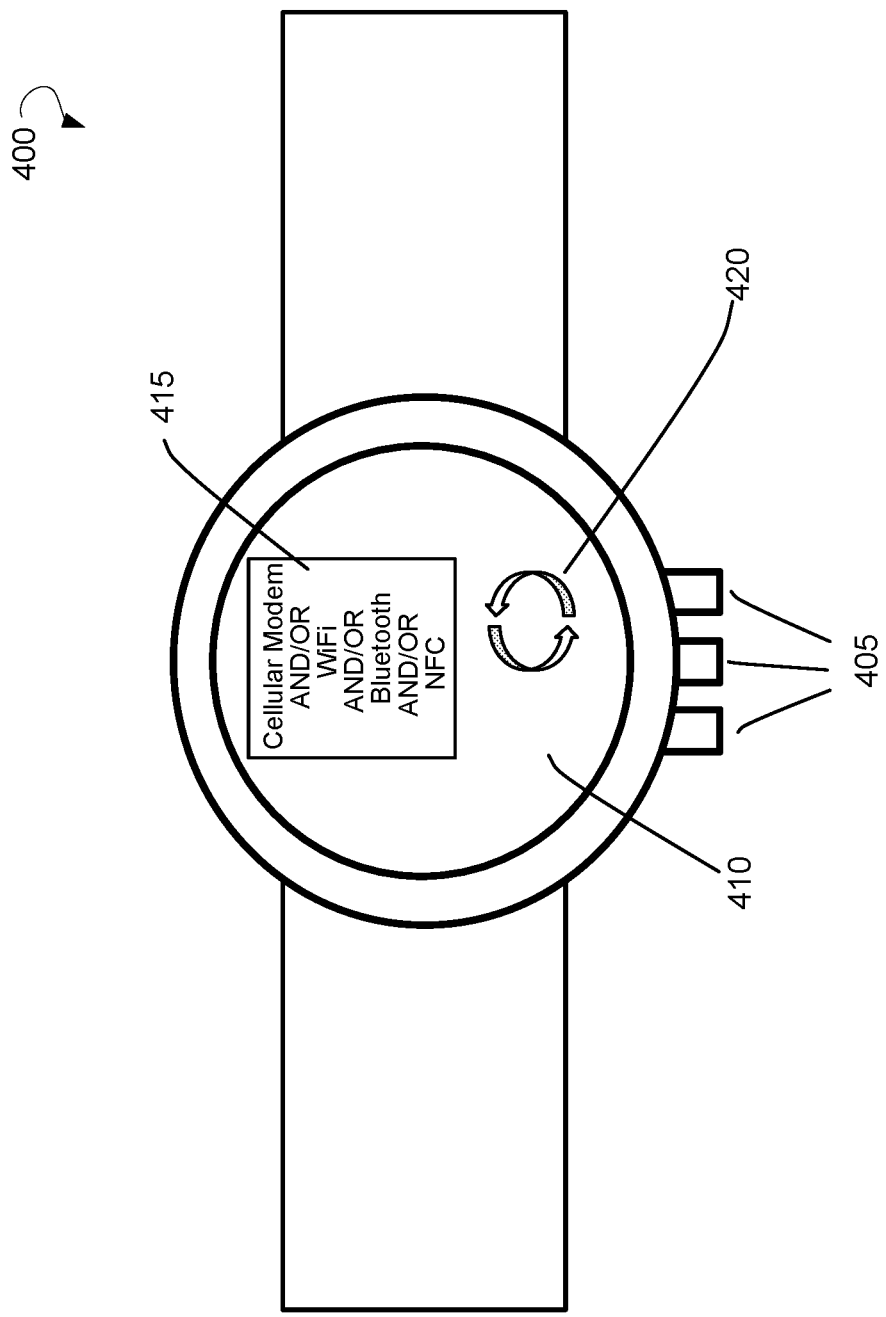
FIG. 4 is block diagram showing a data processing device as a wearable device, according to some example embodiment.

FIG. 4 is block diagram showing a data processing device as a wearable device 400, according to some example embodiments. The wearable device 400 may include sensors 405 fixed at the wearable device 400, a touch screen 410, a wireless connection module 415, and a movement sensor 420. The sensors 405 fixed at the wearable device 400 can include but are not limited to buttons, fingerprint sensor, temperature sensor, pressure sensor, light sensor, camera, and heartrate sensor.

Figure 5:
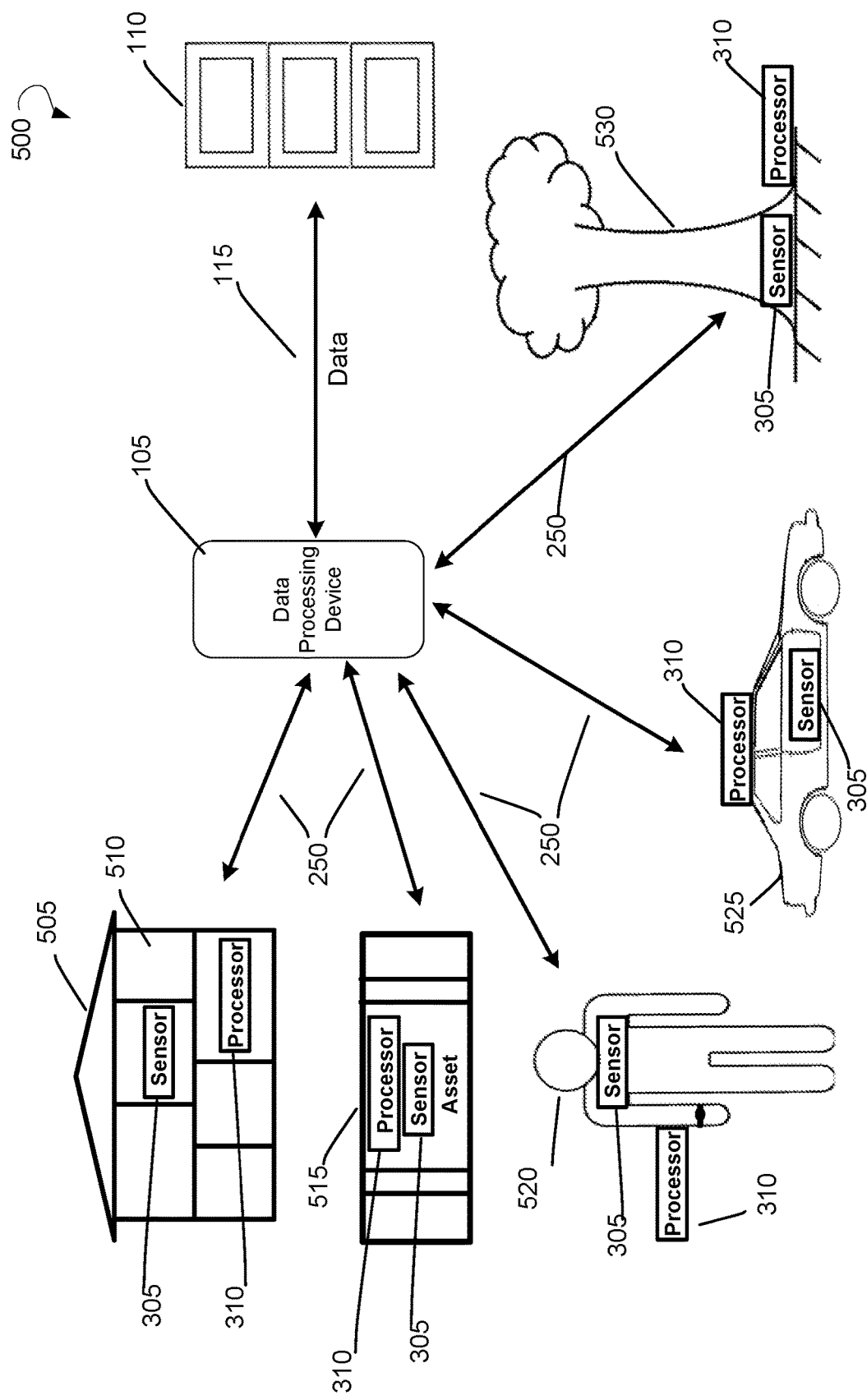
FIG. 5 illustrates an environment within which methods and systems for evaluating and transmitting combined external data from one or more assets to a central data portal can be implemented, according to some example embodiment.

FIG. 5 illustrates an environment 500 within which methods and systems for evaluating and transmitting combined external data from one or more assets to a central data portal can be implemented, according to some example embodiments. The environment 500 may include a data processing device 105 assets, such as a building 505, a room 510, a building 515, a person 520, a vehicle 525, and outdoor location 530, and a central data portal 110. Each of the assets 505, 510, 515, 520, 525, and 530 may include its own source sensor 305 and source processor 310. The assets 505, 510, 515, 520, 525, and 530 may include wireless or wired communication interfaces. The assets 505, 510, 515, 520, 525, and 530 may be communicatively connected with the data processing device 105 by a communication channel 250. The data processing device 105 and the central data portal 110 can be commensurately coupled via a communication channel 115.

In one embodiment of the present disclosure, the data processing device 105 may include a handheld microprocessor device with a touchscreen display, sensors, buttons, and RF transmission capabilities. The central data portal 110 may include data processing and storage hardware capable of receiving data via Internet connection and publishing content to a web browser. The handheld microprocessor device may connect with other devices to collect additional information. The connection can be carried out via a wired connection (Universal Serial Bus or similar connection) or wireless connection (Bluetooth™, NFC, Wi-Fi™, cellular or similar connection) for data transmission. Each of the connected devices may collect data from an asset. The asset can include a person, a vehicle, a facility, indoor environment (for example building and rooms), outdoor environment, an underground object, and so forth. The data collected from all assets can be used to evaluate states of the assets or host assets by the data processing device 105.

In embodiments where the assets include one or more persons, the data processing device 105 may collect, process, and transmit data including, but not limited to: a Global Positioning System (GPS) location, time, speed, direction, orientation, impact detected, impact detected due to gunshot, gunshot detected, biometrics, heartrate, status of buttons and switches, temperature, pressure, light intensity, audio, images, files, magnetic proximity, and biometrics.

In embodiments where the assets include one or more vehicles, the data processing device 105 can collect, process, and transmit data including, but not limited to: a GPS location, time, speed, direction of vehicle, run status, fuel level, door status, crash detected, driver behavior data, gunshot detected, status of buttons and switches, temperature, pressure, light intensity, audio, magnetic proximity, Controller Area Network data, Local Interconnect Network data, Ethernet data, Serial data, Engine diagnostic data, driver status reports, odometer, driver user input display status, electronic driver logs, images, and files.

In embodiments where the assets include indoor environment or outdoor environment, the data processing device 105 can collect, process, and transmit data from, but not limited to, the following sensors: a door sensor, window sensor, gunshot detector, gas detector, and smoke detector. The data may include one or more the following: time, a GPS location, switch status, temperature, pressure, air quality, light intensity, audio, and video.

The data processing device 105 can process the received data to evaluate states of the assets. The evaluated data can be further sent to the central data portal 110 for post-processing (if needed), storage, and visualization. The data from various assets can be used for advanced post processing by combining the evaluated states of the assets to calculate new states. States concerning persons may pertain, but not limited to, impact, panic, physical orientation, responsiveness, gunshot detection, health, safety conditions, state of working, active, or off duty, and location.

States concerning the vehicles may pertain, but not limited to prognostics, diagnostics, running, speeding, idling, tamper, location, and safety. States concerning indoor environments and outdoor environments may pertain, but not limited to safety, air quality, occupancy, and gunshot detected.

Figure 6:
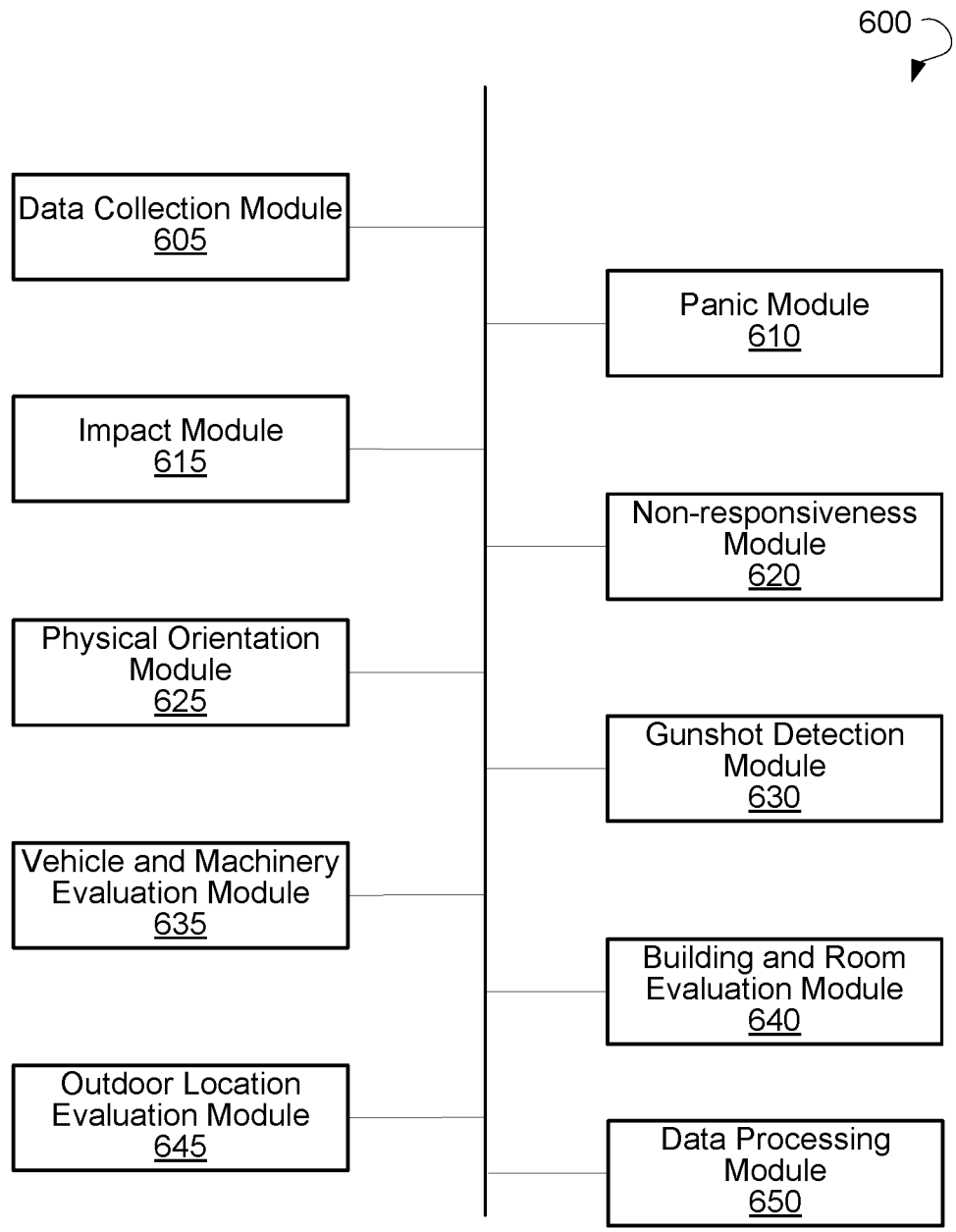
FIG. 6 is a block diagram showing various modules of a system for evaluating and transmitting combined external data from one or more assets to a central data portal, in accordance with certain embodiments.

FIG. 6 is a block diagram showing various modules of a system 600 for evaluating and transmitting combined external data from one or more assets to a central data portal in accordance with certain embodiments. Specifically, the system 600 may include a data collection module 605, a panic module 610, an impact module 615, a non-responsiveness module 620, a physical orientation module 625, a gunshot detection module 630, a vehicle and machinery evaluation module 635, a building and room evaluation module 640, an outdoor location evaluation module 645, and a data processing module 650. In one example embodiment, the modules of the system 600 can be implemented as processor-executable instructions stored in memory of the data processing device 105.

In some embodiments, the data processing device 105 may include a mobile device of a person. The data collection module may continuously collect data from assets, for example, assets 505-530, wearable device 400 worn by a person, sensors, microphone, and movement sensor of the mobile of the data processing device 105 (the mobile device of the person). The data processing module 650 may process the data collected from the assets.

Figure 7:
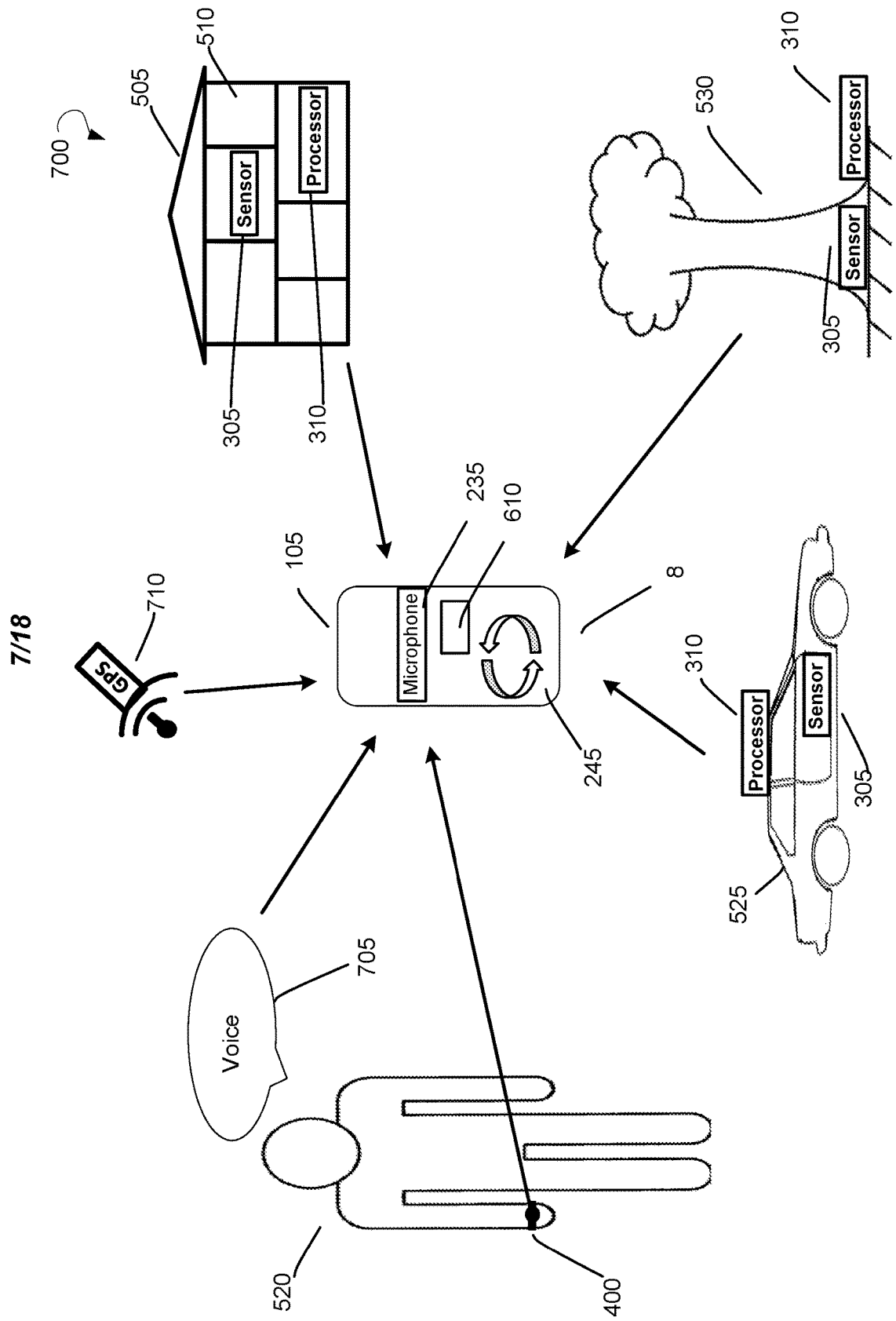
FIG. 7 illustrates an environment within which a panic module of the system for evaluating and transmitting combined external data from one or more assets to a central data portal can be implemented, according to some example embodiments.

FIG. 7 illustrates an environment 700 within which the panic module 610 of the system 600 can be implemented, according to some example embodiments. The environment 700 includes a data processing device 105, a building 505, a room 510, a person 520, a vehicle 525, and an outdoor location 530. The system 600 may be implemented as a software application on the data processing device 105.

Panic module 610 may receive data including: voice commands and speech 705 of person 520 via microphone 235 of the data processing device 105, movement data of the data processing device 105 via movement sensor 245, and a GPS signals 710. The panic module 610 may receive data from wearable devices 400 of the person 520, vehicles 525 and sensors 305 and processor 310 associated with the vehicles 525, outdoor locations 530 and sensors 305 and processor 310 associated with the outdoor locations 530, buildings 505, rooms 510 and sensors 305 and processor 310 associated with the buildings 505 and rooms 510. The panic module 610 can evaluate, based on the received data, a state of a person concerning a panic situation. Data for determining state of panic situation can be collected from inherent sensors of the data processing device 105, connected sources, external sensors, and external stimuli.

In some example embodiments of the present disclosure, a user can trigger the panic event by pressing a button of processing device 105 (for example, a handheld microprocessor device). The panic event can be also triggered based on one or more of the following inputs: motion data of the data processing device 105, voice command, result of speech analysis, touch screen button press or gesture, physical body orientation, audible gunshot detection, pressing a button on a device of a connected source, detection of a voice command by the device of connected source, and so forth. The connected source can include other assets, such as persons, vehicles, machinery, buildings, rooms, outdoor locations, an electronic device, a facility, and so forth. The trigger or a sequence of triggers can be configurable and adaptable for the situation and environment. The trigger can be enabled or disabled based on the location being indoors or outdoors or a proximity to a known location, building, or vehicle or by manual or central data portal commanded input. Voice commands can be set by the user.

The panic module 610 can perform speech analysis of the voice command to determine a panic event. Any word or combination of words in the speech (e.g., in a voice command) can results in and/or trigger any number of events or actions, actual or implicit. A video or imagery captured by the data processing device 105 or an externally connected source device and person heartrate can be analyzed to determine a panic event. The panic event can be transmitted to the central data portal 110 for storage and visualization.

Figure 8:
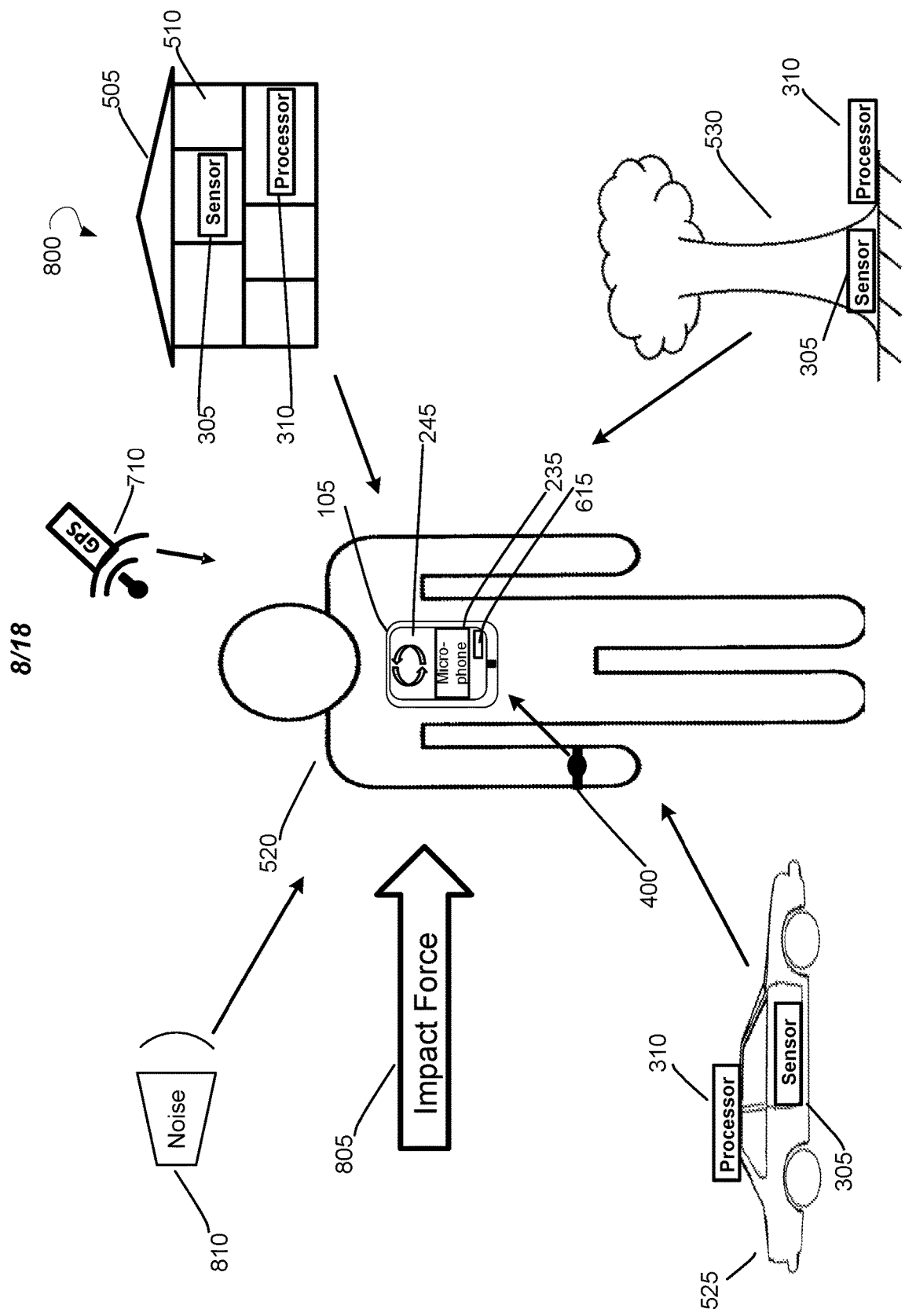
FIG. 8 illustrates an environment within which an impact module of the system for evaluating and transmitting combined external data from one or more assets to a central data portal can be implemented, according to some example embodiments.

FIG. 8 illustrates an environment 800 within which the impact module 615 of the system 600 can be implemented, according to some example embodiments. The environment 800 includes a data processing device 105 and assets such as a building 505, a room 510, a person 520, a vehicle 525, and outdoor location 530. The system 600 can run as a software application on the data processing device 105. The data processing device 105 may include, for example, a handheld microprocessor device worn by the person 520.

The impact module 615 can receive the following data: impact force 805 via movement sensor 245 (accelerometer/gyroscope) of the data processing device 105, environmental noise 810 via microphone 235, person 520 movement via movement sensors 245 (accelerometer/gyroscope), and GPS signals 710. The impact module 615 may receive data from the person 520, wearable devices 400, vehicles 525, sensors 305, and processor 310 associated with vehicles 525, outdoor locations 530 and sensors 305 and processor 310 associated with outdoor locations 530, buildings 505, rooms 510 and sensors 305 and processor 310 associated with buildings 505 and rooms 510. The impact module 615 may evaluate, based on received data, a state of the person pertaining to an impact. Data for determining the state of the person pertaining to an impact (impact event) can be collected from inherent sensors fixed on the device, connected sources, external sensors, and external stimuli.

In some embodiments of the present disclosure, the impact event can be triggered based on determination that impact force applied to a person, vehicle, or a building results in an acceleration of the data processing device 105 (handheld microprocessor device) or a sensor connected to the data processing device 105. The acceleration as sensed by an accelerometer and or gyroscope can be evaluated by computing amplitude of the acceleration over time in both time domain and frequency domain. The trigger and or sequence of triggers can be configurable and adaptable for the situation and environment. The trigger can be enabled or disabled based on the location indoors or outdoors or proximity to known people, location, building, or vehicle or by manual input or command from the central data portal 110. Other sensors and inputs can be used to evaluate the acceptance of the impact triggers. These inputs may include but are not limited to person heartrate, button press, voice command, environmental noise, audible gunshot detection, GPS signal, indoor positions, physical body orientation, connected source device button press, connected source device voice command, and so forth. The connected source may include other persons, vehicles, machinery, buildings, rooms, outdoor locations, and other assets. The event data can be transmitted to the central data portal for storage and visualization.

Figure 9:
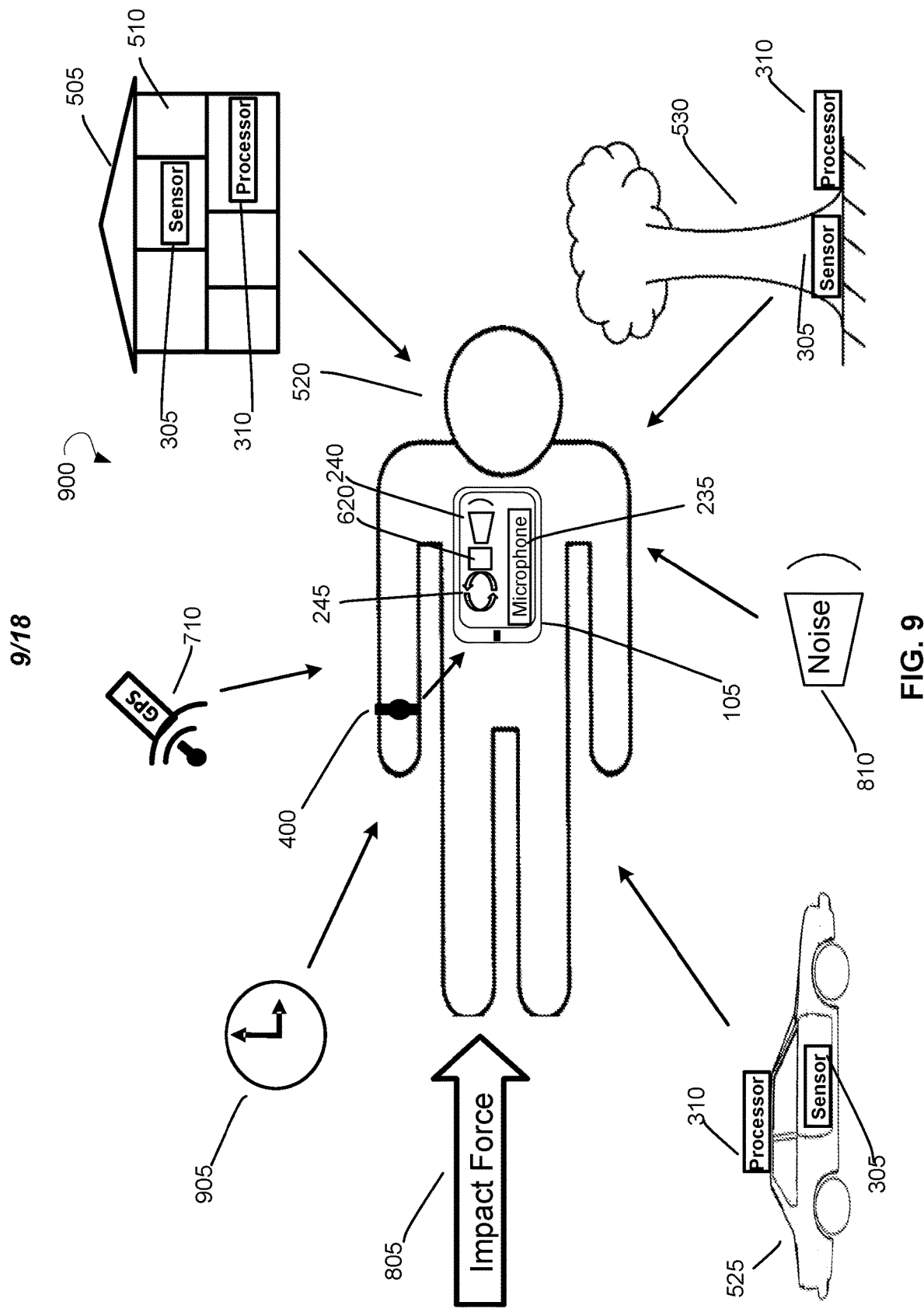
FIG. 9 illustrates an environment within which a non-responsiveness module of the system for evaluating and transmitting combined external data from one or more assets to a central data portal can be implemented, according to some example embodiments.

FIG. 9 illustrates an environment 900 within which the non-responsiveness module 620 of the system 600 can be implemented, according to some example embodiments. The environment 900 includes a data processing device 105 and assets, such as a building 505, room 510, person 520, vehicle 525, and outdoor location 530. The system 600 may be implemented as a software application running on the data processing device 105.

The non-responsiveness module 620 may receive the following data: relative time 905 as calculated by the data processing device 105 (for example, a handheld microprocessor device), impact force 805 movement data via movement sensors 245 (accelerometer/gyroscope), environmental noise 810 detected by microphone 235, person 520 movement detected by movement sensors 245 (accelerometer/gyroscope), physical body orientation of the person 520, and so forth. The data can be also received from wearable devices 400 of the person 520, GPS signals 710, vehicle 525 and sensors 305 and processor 310 associated with the vehicle 525, outdoor locations 530, sensors 305, processor 310 associated with outdoor locations 530, buildings 505, rooms 510, sensors 305, and processor 310 associated with the buildings 505 and rooms 510. The non-responsiveness module 620 may evaluate, based on the received data, a state of the person pertaining to the non-responsiveness. Data for determining the state of the person pertaining to the non-responsiveness can be collected from inherent sensors fixed on the data processing device 105, connected sources, external sensors, and external stimuli.

In some embodiments of the present disclosure, a non-responsiveness event can be triggered based on a duration of time during which acceleration and or orientation of the data processing device 105 (for example, a handheld microprocessor device) or a connected sensor is below a threshold. The threshold can be configurable and adaptable. The acceleration and orientation as sensed by an accelerometer and or gyroscope can be evaluated by computing amplitude of the acceleration and/or orientation over time in both time domain and frequency domain. The trigger or sequence of triggers can be configurable and adaptable for the situation and environment. The trigger can be enabled or disabled based on the location of person indoors or outdoors or proximity to a known people, location, building, or vehicle or by manual or central data portal commanded input. Other sensors and inputs can be used to evaluate the acceptance of the non-responsiveness trigger. These inputs may include but are not limited to person's heartrate, button press, voice command, environmental noise, audible gunshot detection, GPS signal, indoor positions, physical body orientation, connected source device button press, and connected source device voice command. Connected sources may include other persons, vehicles/machinery, buildings/rooms, outdoor locations, and other assets. The event data can then be transmitted to the central data portal for storage and visualization.

Figure 10:
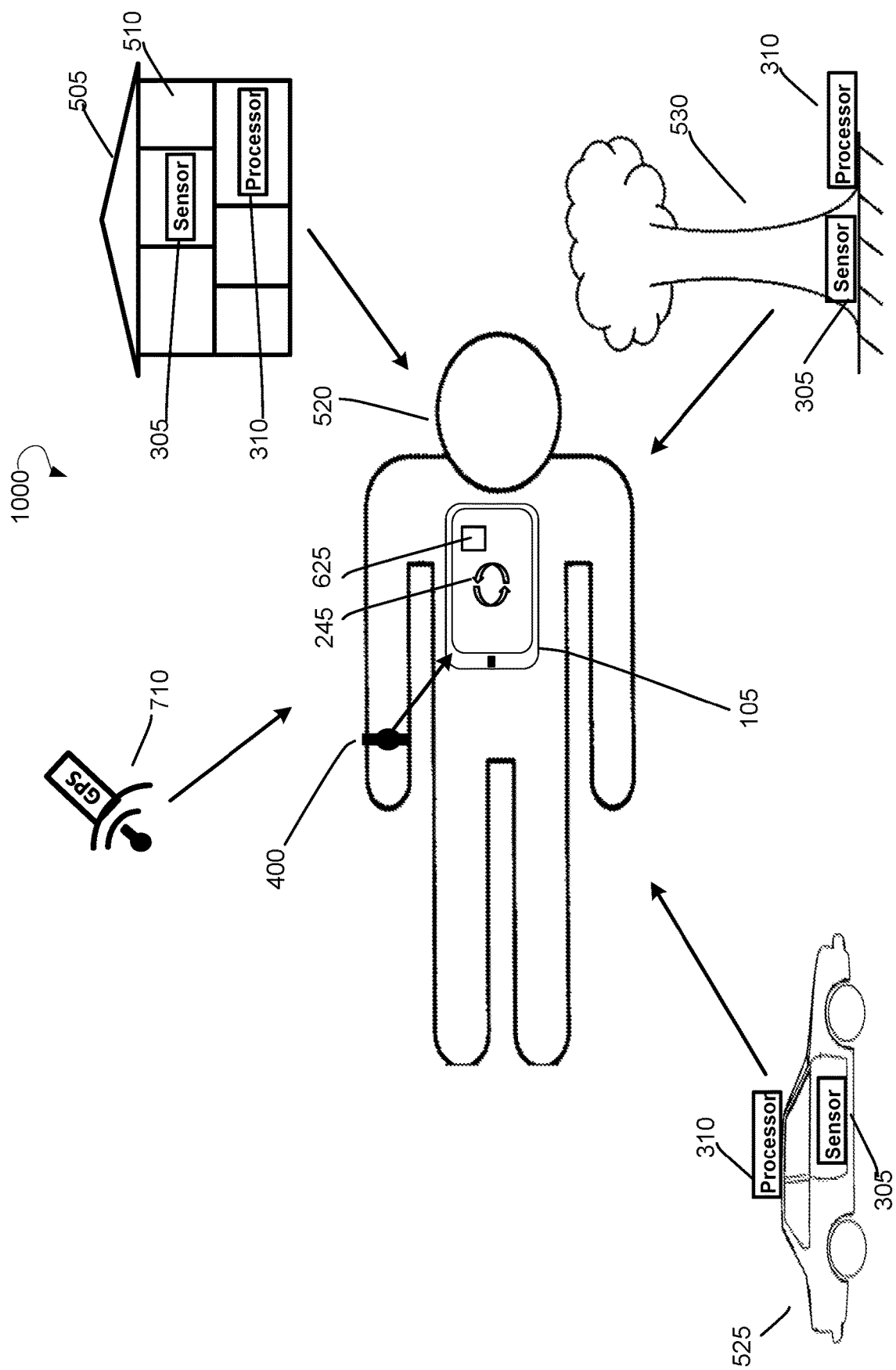
FIG. 10 illustrates an environment within which a physical orientation module of the system for evaluating and transmitting combined external data from one or more assets to a central data portal can be implemented, according to some example embodiments.

FIG. 10 illustrates an environment 1000 within which physical orientation module 625 of the system 600 can be implemented, according to some example embodiments. The environment 1000 can include a data processing device 105 and assets such as building 505, room 510, person 520, vehicle 525, and outdoor location 530. The system 600 may run as a software application on the data processing device 105.

The physical orientation module 625 may receive data from the following sources: person 520 transferred movement via movement sensors 245 (accelerometer/gyroscope), wearable devices 400 of the person 520, GPS signals 710, vehicles 525 and sensors 305 and processor 310 associated with the vehicles 525, outdoor locations 530 and sensors 305 and processor 310 associated with outdoor locations 530, buildings 505, rooms 510, sensors 305, processor 310 associated with the buildings 505, and rooms 510. The physical orientation module 625 may evaluate, based on the received data, a state of physical orientation of the person 520. The physical orientation module 625 may also calculate the state of the person 520 based on GPS and RF data. The GPS and RF data can be collected from sensors or data processing devices associated with any assets, such as the person 520 or any assets in proximity to or associated with the person 520. The state pertaining to physical orientation of the person 520 can be evaluated based on data collected from inherent sensors fixed on the device, connected sources, external sensors, and external stimuli.

In some embodiments of the present disclosure, the state of the physical orientation can be evaluated based on determination that acceleration and/or orientation to the data processing device 105 or connected sensor is within a threshold range. The threshold range can be configurable and adaptable. The acceleration and/or orientation as sensed by an accelerometer and or gyroscope can be evaluated by computing an amplitude of the acceleration or orientation over time in both time domain and frequency domain. The state and/or sequence of states can be configurable and adaptable for the situation and environment. The determination of the state can be enabled or disabled based on the location of person indoors or outdoors or proximity to known people, location, building, or vehicle or by manual or central data portal commanded input. Other sensors and inputs can be used to evaluate the acceptance of the orientation state. These inputs may include but are not limited to button press, GPS signal, indoor positions, connected wearable device orientation, connected source device button press. Connected sources may include other persons, vehicles/machinery, buildings/rooms, outdoor locations, and other assets. The state of the physical orientation to the person can be transmitted to the central data portal for storage and visualization.

Figure 11:
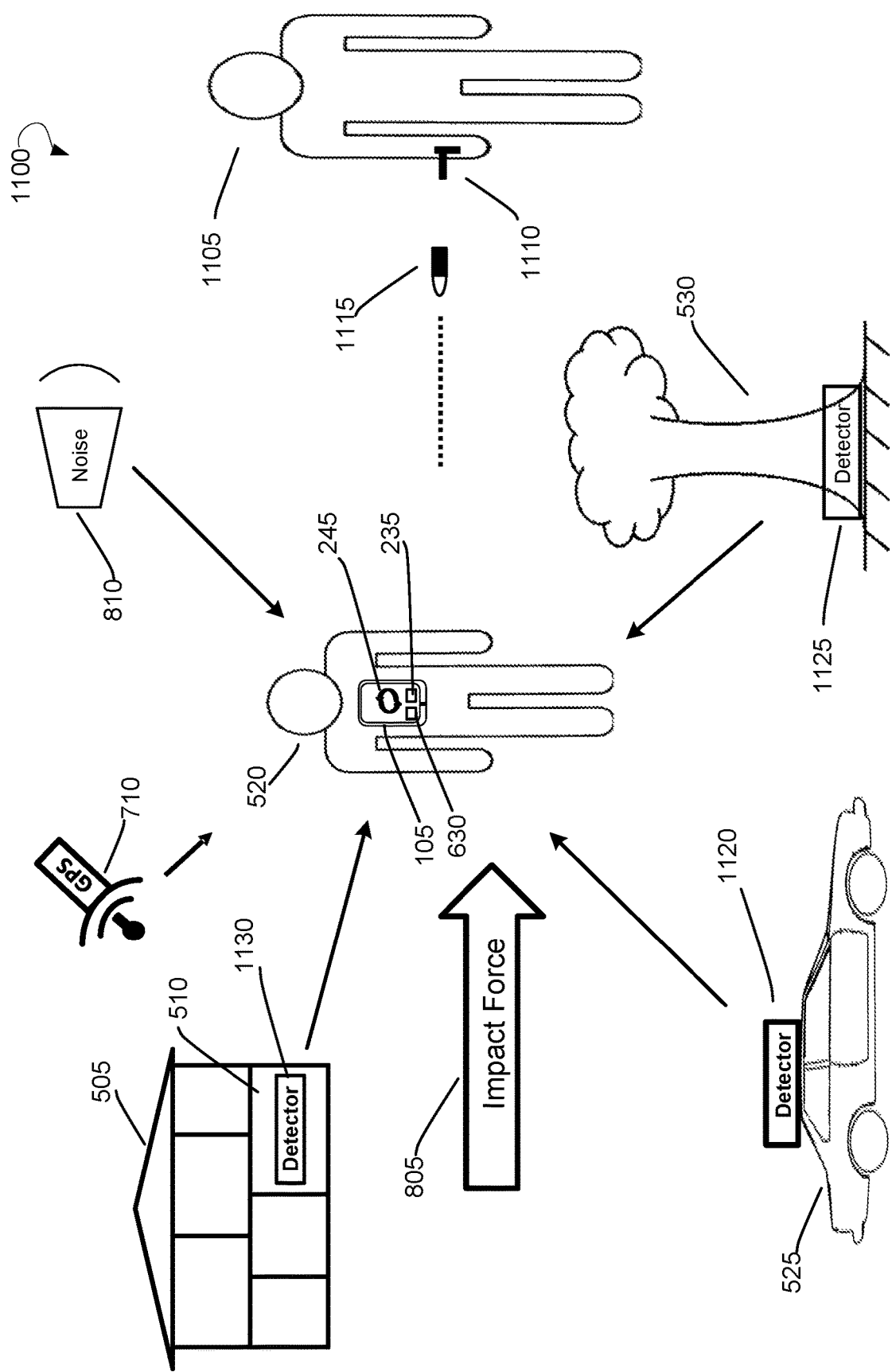
FIG. 11 illustrates an environment within which a gunshot detection module of the system for evaluating and transmitting combined external data from one or more assets to a central data portal can be implemented, according to some example embodiments.

FIG. 11 illustrates an environment 1100 within which gunshot detection module 630 of the system 600 can be implemented, according to some example embodiments. The environment 1100 includes a data processing device 105 and assets such as building 505, room 510, person 520, vehicle 525, outdoor location 530, shooter 1105, firearm 1110, and bullet 1115. The system 600 may be implemented to run as a software application on the data processing device 105.

The gunshot detection module 630 can be configured to detect the presence of an audible gunshot of a bullet 1115 from firearm 1110 and the location of the shooter 1105. The gunshot detection module 630 may receive the following data: impact force 805 movement via movement sensors 245 (accelerometer/gyroscope), environmental noise (810) via microphone 235, and GPS signals 710. The data can be also received from wearable devices 400 of the person 520, vehicles 525 and vehicle detectors 1120, outdoor locations 530 and associated outdoor detectors 1125, and buildings 505 and rooms 510 and their associated indoor detectors 1130. The gunshot detection module 630 may evaluate, based on the received data, a state of gunshot detected status. Data for detection of gunshots can be collected from inherent sensors of the data processing device 105, connected sources, external sensors, and external stimuli.

In some embodiments of the present disclosure, the data processing device 105 may trigger a gunshot detection event by determining that audible input is above a threshold. The threshold can be configurable and adaptable. The audible input due to a firearm discharging and projectile can be detected by microphone of the data processing device 105 or connected sensor. The audible input as sensed by the microphone can be evaluated by computing the amplitude of the audible input over time in both time domain and frequency domain. The trigger and or sequence of triggers can be configurable and adaptable for the situation and environment. The trigger can be enabled or disabled based on the location of person indoors or outdoors or proximity to a known people, building, or vehicle or by manual input or command from central data portal. Other sensors and inputs can be used to evaluate the acceptance of the shot detection trigger. These inputs may include but are not limited to person's heartrate, button press, voice command, environmental noise, GPS signal, indoor positions, connected source device button press, and connected source device audio input. The connected source can include other persons, vehicles, machinery, buildings, rooms, outdoor locations, and other assets. The event data can be transmitted to the central data portal for storage, and visualization.

Figure 12:
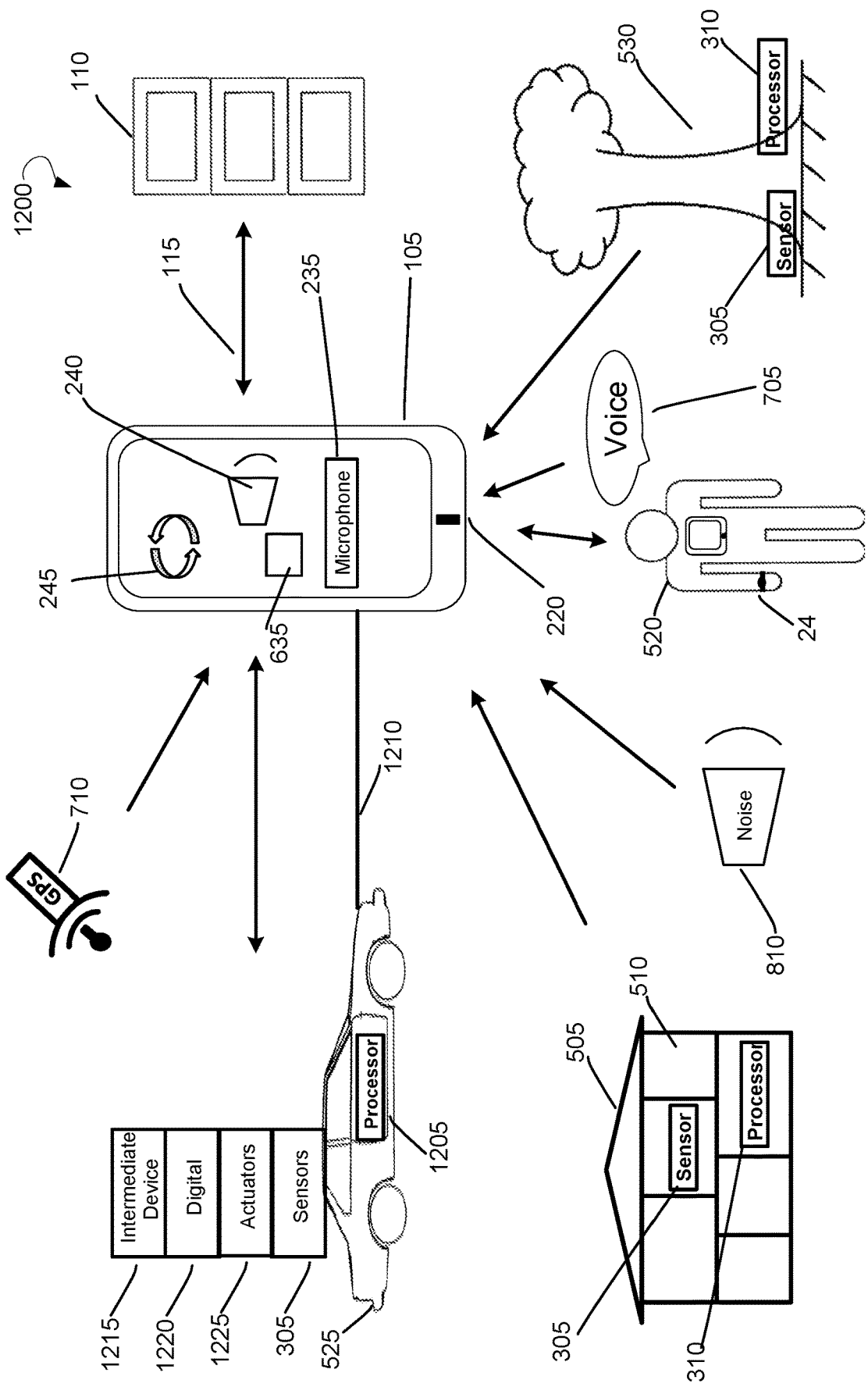
FIG. 12 illustrates an environment within which a vehicle and machinery evaluation module of the system for evaluating and transmitting combined external data from one or more assets to a central data portal can be implemented, according to some example embodiments.

FIG. 12 illustrates an environment 1200 within which vehicle and machinery evaluation module 635 of the system 600 can be implemented, according to some example embodiments. The environment 1200 includes a data processing device 105 and assets such as building 505, room 510, person 520, vehicle 525, and outdoor location 530, and central data portal 110. The system 600 may run as a software application on the data processing device 105.

The vehicle and machinery evaluation module 635 may receive data from a vehicle 525. Data may be pertaining to the vehicle's past, current and future performance and operation running state as evaluated by vehicle processor 1205. The data can be transmitted to the data processing device 105 via a wired connection 1210 or wirelessly. The data processing device 105 may receive the vehicle's data directly from the vehicle 525 or via an intermediate vehicle communication and processing device 1215. Sensor data from sensors 305 and digitally communicated vehicle and machinery data 1220 can be transmitted to the data processing device 105, processed at the data processing device 105, and then transmitted to the central data portal 110 over communication channel 115.

The data processing device 105 can receive commands from a person 520 and or central data portal 110 to actuate actuators 1225 and/or modify data of the vehicle processor 1205 on the vehicle 525. The data processing device 105 can receive commands from a person 520 and or central data portal 110 to modify data or command outputs of the vehicle intermediate vehicle communication and processing device 1215. Upon receiving the command outputs, the intermediate vehicle communication and processing device 1215 can actuate one or more states of the vehicle 525. The states may include, but are not limited to, one or more of the following: a vehicle running state, states of lights, states of pumps, states of doors, and states of windows.

Connected sensors and sources can be used for the mutual evaluation of the sensors associated with vehicle 525 and person 520 and other sources. The sources may include the following: GPS signals 710, other vehicles and sensors and processor associated with other vehicles, outdoor locations 530 and sensors 305 and processor 310 associated with the outdoor locations, buildings 505 and rooms 510, sensors 305 and processor 310 associated with buildings 505 and rooms 510, and person wearable devices 400. The evaluation can be based on the following data: person 520 movement detected via movement sensors 245 (accelerometer/gyroscope), voice commands and speech 705 detected via microphone 235, environmental noise 810 detected via microphone 235, data from bio-metrics sensors either inherent to the data processing device 105 or external to the data processing device 105, verbal passwords, and visual passwords. Motions or RF communications can be used to allow/deny access to vehicle 525 for person 520 by way of unlocking/locking or opening/closing passageways.

In some embodiments, the data for evaluation of state of vehicle 525 and person 520 can be collected from inherent sensors fixed on the data processing device 105 (e.g., a handheld microprocessor device), a vehicle connected to the data processing device 105, external sensors, and external stimuli. The data processing device 105 may collect data from the vehicle via a wired or wireless connection. Data can be collected directly from the vehicle or through an intermediate communication and processing device. The digitally communicated vehicle data collected either directly or through the intermediate device can be in the form of an industry standard protocol. The industry protocols may include but are not limited to SAE J1939, SAE J1708, SAE J1587, OBD-II, CAN FD, CAN 2.0 A/B, LIN, Flexray, RS-232, Modbus, CANopen.

The data collected from the vehicle can be evaluated by the data processing device 105 to determine vehicle's performance, diagnostics, and prognostics. The data for evaluation can be received from other sensors and sources. The data may include but are not limited to, person's heartrate, button press, voice command, biometrical noise, bio-metrics for vehicle access to door lock state and powertrain run state, audible gunshot detection, GPS signal, indoor positions, gas detection, smoke detection, temperature, video and images, impact force imposed on the handheld microprocessor device, physical body orientation, connected source device button press, and connected source device voice command. Connected sources may include other persons, vehicles, machinery, buildings, rooms, outdoor locations, and other assets.

The interface between the vehicle 525 and the data processing device 105 (for example, a handheld microprocessor device) may include a graphical display of the handheld microprocessor device or connected intermediate device. The graphical display may provide feedback concerning vehicle performance, diagnostics, and prognostics. The graphical display may provide a mode for additional user input. Evaluations can be configurable and adaptable for the situation and environment. The evaluation can be enabled or disabled based on the location of the vehicle and whether the person is indoors or outdoors or the proximity to a known person, location, asset, building, or vehicle. The evaluation can be enabled by manual input or command from the central data portal. The evaluated data can be transmitted to the central data portal for storage and visualization.

Figure 13:
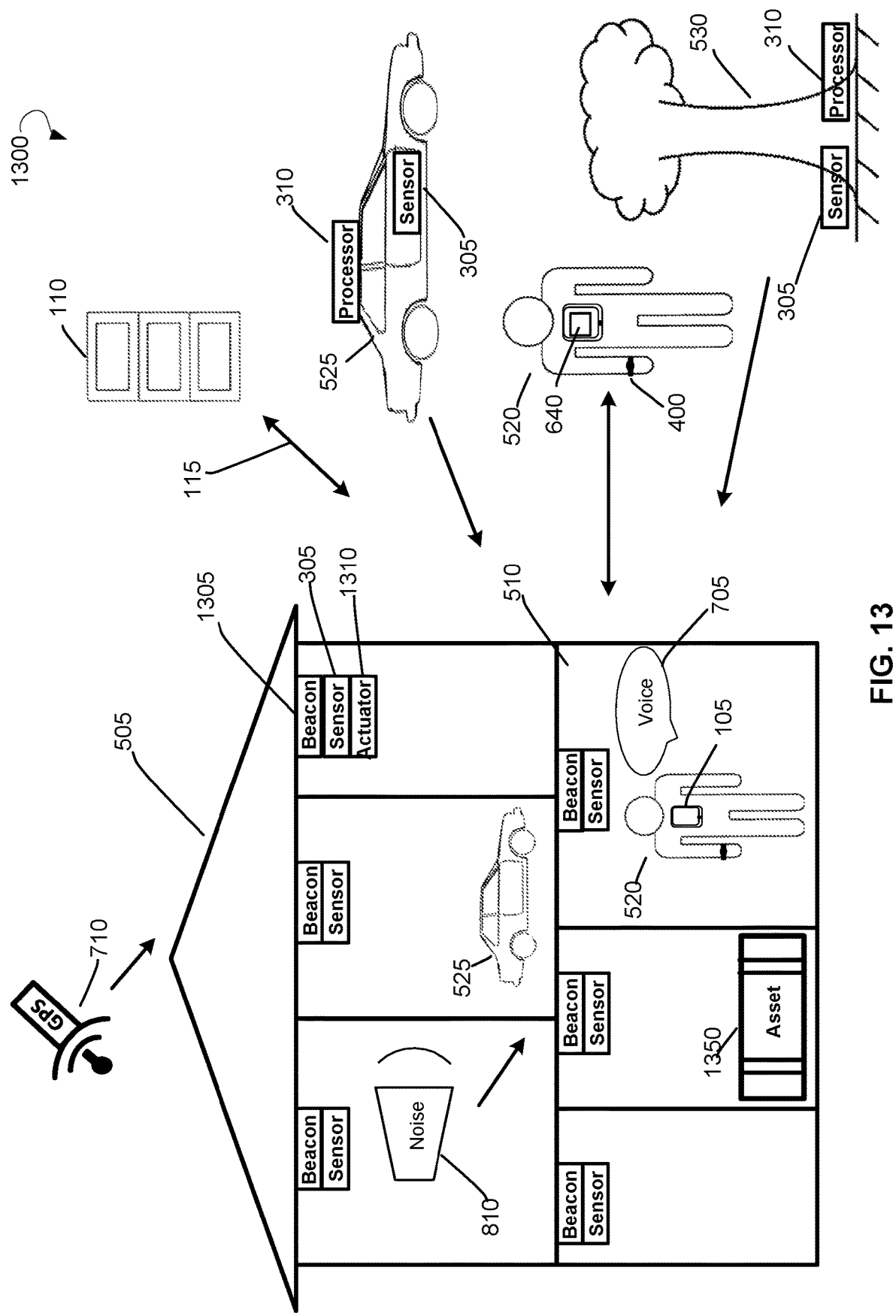
FIG. 13 illustrates an environment within which a building and room evaluation module of the system for evaluating and transmitting combined external data from one or more assets to a central data portal can be implemented, according to some example embodiments.

FIG. 13 illustrates an environment 1300 within which building and room evaluation module 640 of the system 600 can be implemented, according to some example embodiments. The environment 1300 includes a data processing device 105 and assets, such as a building 505, room 510, person 520, vehicle 525, outdoor location 530, and central data portal 110. The system 600 may run as a software application on the data processing device 105.

The building and room evaluation module 640 may receive data from a connected room sensor 305 or beacon 1305. Data can pertain to states of the building and room and environment of the building and room. The data can be transmitted to the data processing device 105 via wireless data connectivity. Data can be transmitted to the data processing device 105, processed, and then transmitted to the central data portal 110 via a communication channel 115.

Connected sensors and sources can be used for the mutual evaluation of the buildings 505, rooms 510, and host person 520. The sensors may include but are not limited to door open detectors, window open detectors, temperature sensors, smoke detector, gas detector, fire detector, humidity sensors, air quality sensors, gunshot detector, lock, door barricade deployment, explosion detectors, glass break detectors, door impact detectors, wall impact detectors, and GPS signals 710. The data can be obtained from other buildings and rooms and sensors and beacons associated with the other buildings and rooms, outdoor locations 530 and associated sensors 305 and processor 310, and person's wearable devices 400. The data may include voice commands and speech detected via microphone 235 (shown in FIG. 2), or environmental noise detected via microphone 235.

The data processing device 105 can receive commands from a person 520 or central data portal 110. The commands can be generated as a result of evaluation of the building and/or room. The commands can result in actuation of room actuators 1310. Beacons 1305, other sensors, and sensors of the data processing device 105 can be used for determining positions of people 520, assets 1350, and vehicles 525 within the building 505 or room 510. Bio-metrics sensors either inherent to the data processing device 105 or external to the data processing device 105, verbal passwords, visual passwords, motion, or RF communication can be used to allow/deny access to building 505 and/or room 510 for person 520 by way of unlocking/locking or opening/closing passageways.

The building and room evaluation module 640 may evaluate state of the building, room and person both individually and collectively. Data for the evaluation can be collected from inherent sensors fixed on the data processing device 105 (for example, a handheld microprocessor device), sensors/beacons/processor of connected room, external sensors and external stimuli.

In some embodiments, the data processing device 105 may collect data from the building/room via a wireless connection. Data can be collected directly from the building/room or through an intermediate communication and processing device. The data collected from the building/room can be evaluated to determine building/room status. The evaluation may also be based on data from other sensors and sources. These data may include but are not limited to a signal from a person heartrate sensor, button press, voice command, environmental noise, bio-metrics for building/room access to passageway lock state, audible gunshot detection, GPS signal, indoor positions, gas detection, smoke detection, temperature, humidity, air quality, video and images, impact force imposed on handheld microprocessor device, physical body orientation, connected source device button press, connected source device voice command. Connected sources may include other persons, vehicles/machinery, buildings/rooms, outdoor locations, and other assets.

In some embodiments, an interface between the building/room and the data processing device 105 may include a graphical display of the data processing device 105 or connected intermediate devices. The graphical display may provide feedback on building/room status. The graphical display may provide a mode for additional user input. Evaluations of a status of the building or room can be configurable and adaptable for the situation and environment. The evaluation can be enabled or disabled based on the location indoors or outdoors or proximity to a known person, location, building, or vehicle or by manual or central data portal commanded input. The evaluated data can be transmitted to the central data portal for storage and visualization.

Figure 14:
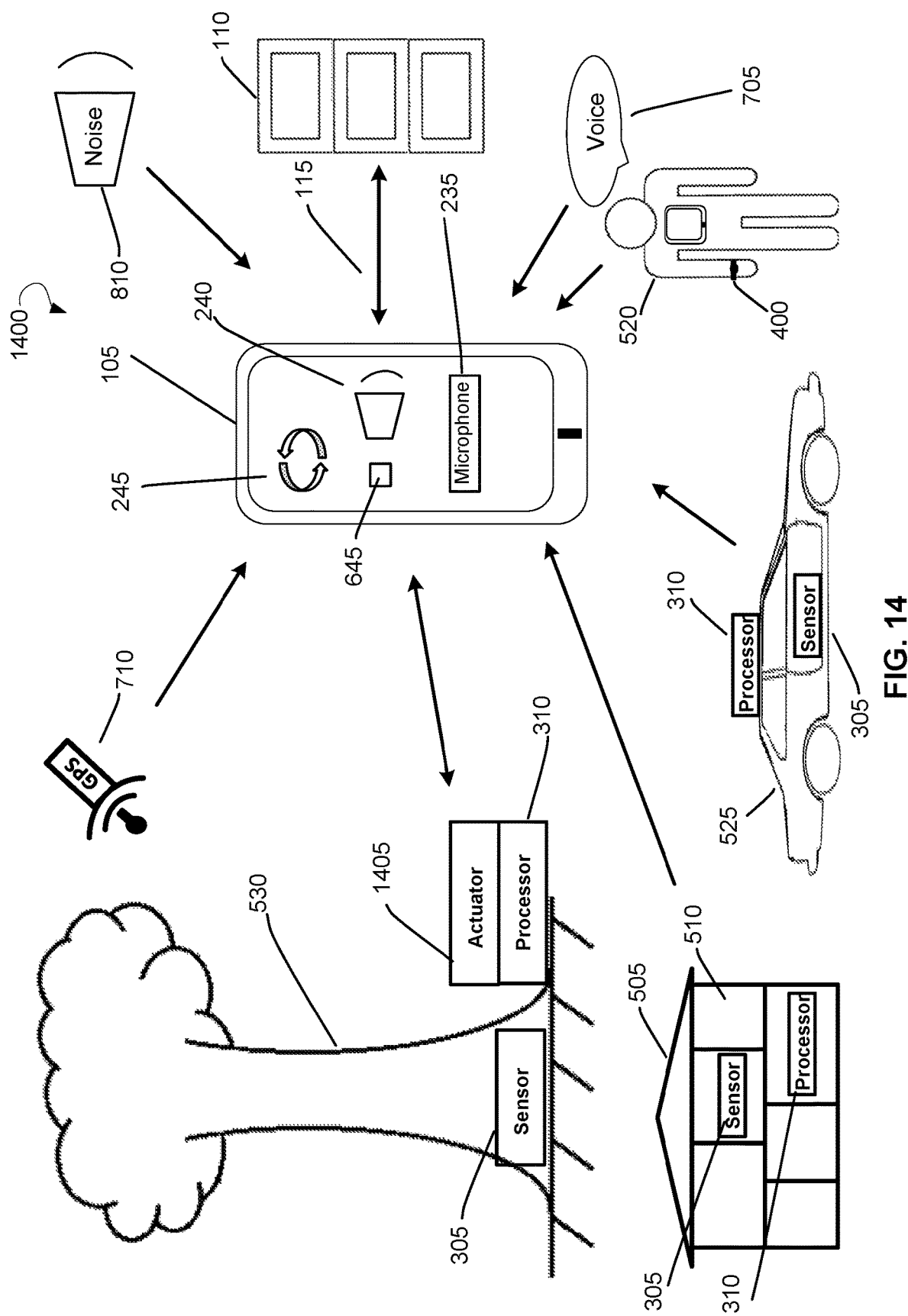
FIG. 14 illustrates an environment within which an outdoor location evaluation module of the system for evaluating and transmitting combined external data from one or more assets to a central data portal can be implemented, according to some example embodiments.

FIG. 14 illustrates an environment 1400 within which outdoor location evaluation module 645 of the system 600 can be implemented, according to some example embodiments. The environment 1300 includes a data processing device 105, assets such as a building 505, a room 510, person 520, a vehicle 525, and outdoor location 530, and central data portal 110. The system 600 may run as a software application on the data processing device 105.

The outdoor location evaluation module 645 may receive data from a connected outdoor location 530 and sensors 305 and a processor 310 associated with the outdoor location. The data may pertain to the outdoor location environment. The data can be transmitted to the data processing device 105 via a wireless communication channel. The data can be further transmitted from the data processing device 105 to the central data portal 110 via communication channel 115.

Connected sensors and sources can be used for the mutual evaluation of the outdoor location 530 and host person 520. The sensors may include but are not limited to a temperature detector, smoke detector, gas detector, fire detector, humidity detector, air quality detector, gunshot detector, and explosion detector. The sources may include GPS signals 710, other outdoor locations and sensors and processors associated with the other outdoor locations, buildings 505, rooms 510, and sensors 305 and processors 310 associated with the buildings 505 and rooms 510, person 520 movement and transferred movement to movement sensors 345 (accelerometer/gyroscope), wearable devices 400 of the person 520, voice commands and speech 705 via microphone 235, and environmental noise 810 via microphone 235. The data processing device 105 can receive commands from a person 520 and the central data portal 110. The commands can be generated based result of evaluation of the outdoor location. The commands can result in actuation of outdoor actuators 1405.

The outdoor location evaluation module 645 may be configured to evaluate states of the outdoor location and the person both individually and collectively. Data can be collected from inherent sensors fixed on the data processing device 105 (e.g., a handheld microprocessor device) worn by the person 520, connected outdoor location sensors and processors, and external sensors and external stimuli.

In some embodiment of the present disclosure, the data processing device 105 (for example, the handheld microprocessor device) may collect data from the outdoor location 530 via a wireless connection. Data can be collected directly from the outdoor location or through an intermediate communication and processing device. The data collected from the location 530 can be used for evaluation of outdoor location status. The evaluation of the outdoor location status can also be based on data received from other sensors and sources. The data may include but are not limited to person's heartrate, button press, voice command, environmental noise, data of audible gunshot detectors, GPS signal, indoor positions, data of gas detectors, data of smoke detectors, temperature, humidity, air quality, video and images, impact force imposed on handheld microprocessor device, physical body orientation, connected source device button press, and connected source device voice command. The connected source may include other persons, vehicles/machinery, buildings/rooms, other outdoor locations, and other assets.

The outdoor location evaluation module 645 may provide an interface between the outdoor location and the data processing device 105 via a graphical display of the handheld microprocessor device or connected intermediate device. The graphical display may provide feedback on outdoor location status. The graphical display may provide a mode for additional user input. Evaluations of status of outdoor location can be configurable and adaptable based on situation and environment. The evaluation can be enabled or disabled based on the location indoors or outdoors or proximity to other assets such as a known person, location, building, or vehicle. The evaluation can be enabled by manual input or command from central data portal. The evaluated data can be transmitted to the central data portal for storage and visualization.

Figure 15:
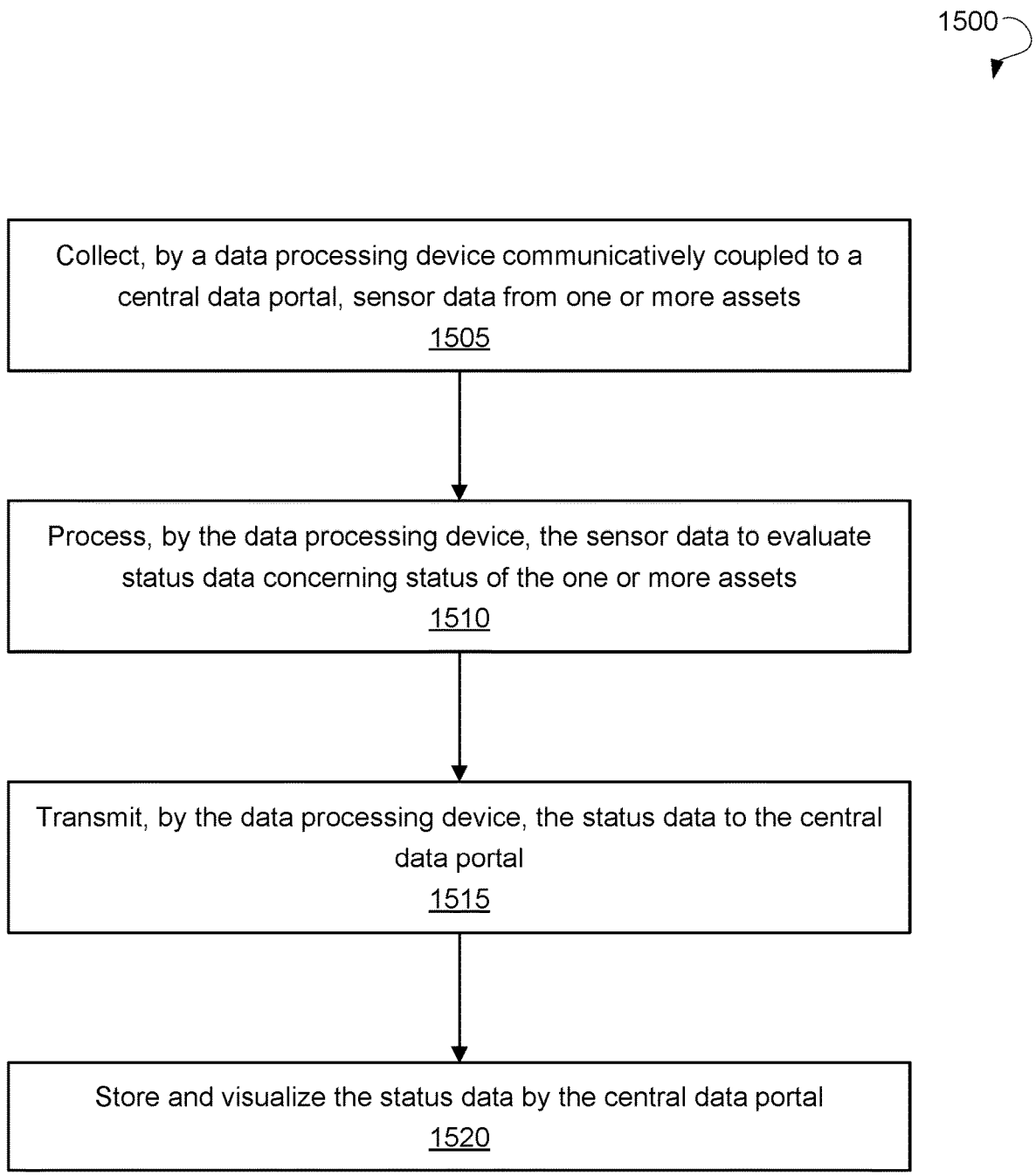
FIG. 15 is a flow chart showing a method for evaluating and transmitting combined external data from one or more assets to a central data portal, according to an example embodiment.

FIG. 15 is flow chart illustrating a method 1500 for evaluating and transmitting combined external data from one or more assets to a central data portal. The method 1500 can be performed within environment 100 shown in FIG. 1 or environment 700 shown in FIG. 7.

The method 1500 may commence, in block 1505, with collecting, by a data processing device communicatively coupled to a central data portal, sensor data from one or more assets. In block 1510, the method 1500 may proceed with processing, by the data processing device, the sensor data to evaluate status data concerning status of the one or more assets. In block 1515, the method 1500 may proceed with transmitting, by the data processing device, the status data to the central data portal. In block 1520 may proceed with storing and visualizing, by the central data portal, the status data.

Figure 16:
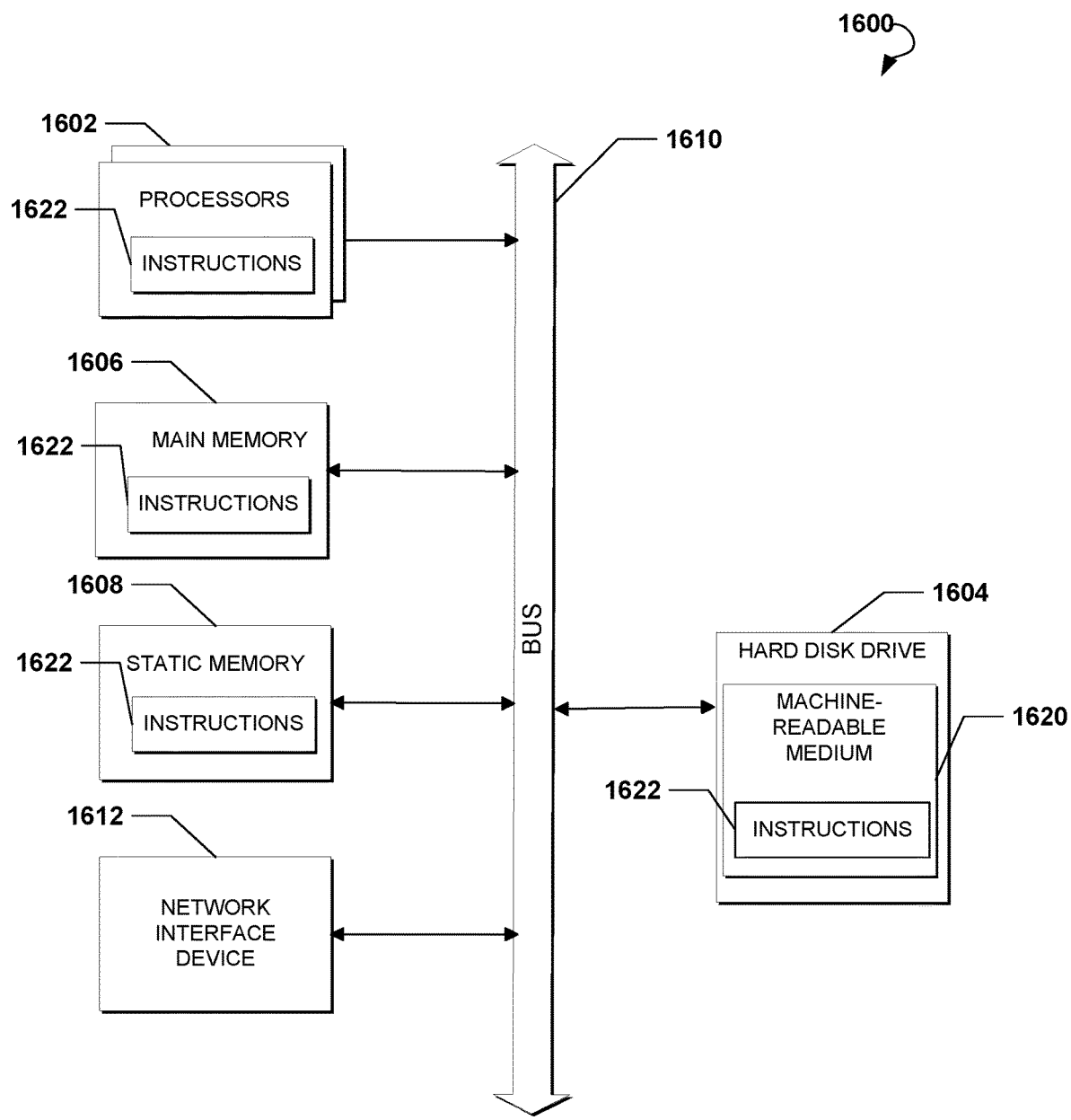
FIG. 16 shows a computing system that can be used to implement a method for evaluating and transmitting combined external data from one or more assets to a central data portal, according to an example embodiment.

FIG. 16 shows a diagrammatic representation of a computing device for a machine in the exemplary electronic form of a computer system 1600, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a PC, a tablet PC, a set-top box, a cellular telephone, a digital camera, a portable music player (e.g., a portable hard drive audio device, such as a Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1600 may include a processor or multiple processors 1602, a hard disk drive 1604, a main memory 1606, and a static memory 1608, which communicate with each other via a bus 1610. The computer system 1600 may also include a network interface device 1612. The hard disk drive 1604 may include a computer-readable medium 1620, which stores one or more sets of instructions 1622 embodying or utilized by any one or more of the methodologies or functions described herein. The instructions 1622 can also reside, completely or at least partially, within the main memory 1606 and/or within the processors 1602 during execution thereof by the computer system 1600. The main memory 1606 and the processors 1602 also constitute machine-readable media.

While the computer-readable medium 1620 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, Random Access Memory, Read-Only Memory, and the like.

The example embodiments described herein may be implemented in an operating environment comprising software installed on a computer, in hardware, or in a combination of software and hardware.

In some embodiments, the computer system 1600 may be implemented as a cloud-based computing environment, such as a virtual machine operating within a computing cloud. In other embodiments, the computer system 1600 may itself include a cloud-based computing environment, where the functionalities of the computer system 1600 are executed in a distributed fashion. Thus, the computer system 1600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 1600, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Figure 17:
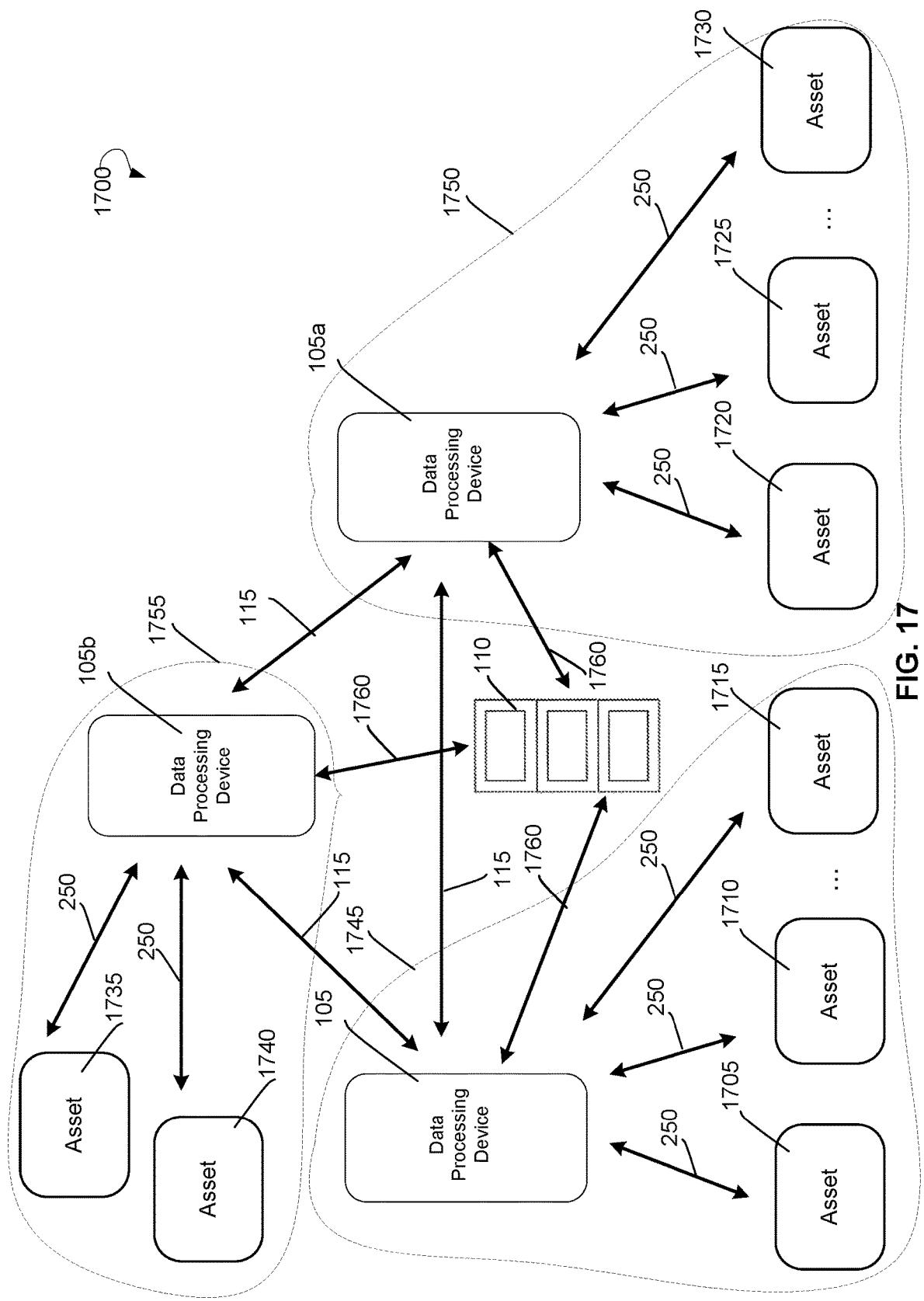
FIG. 17 is a schematic diagram illustrating aggregation of data by multiple data processing devices, according to an example embodiment.

FIG. 17 is a schematic diagram 1700 illustrating aggregation of data by multiple data processing devices, according to an example embodiment. Each of the data processing devices 105, 105a, and 105b can be configured to collect sensor data from a set of assets. Specifically, the data processing device 105 can be configured to collect the sensor data from assets 1705, 1710, and 1715. The data processing device 105 can communicate with the assets 1705, 1710, and 1715 via a communication channel 250 established between the data processing device 105 and each of the assets 1705, 1710, and 1715. The data processing device 105 and the assets 1705, 1710, and 1715, in communication with the data processing device 105, can create a local network 1745 of connected devices.

Similarly, the data processing device 105a can be configured to collect the sensor data from assets 1720, 1725, and 1730. The data processing device 105a may communicate with the assets 1720, 1725, and 1730 via a communication channel 250 established between the data processing device 105a and each of the assets 1720, 1725, and 1730. The data processing device 105a and the assets 1720, 1725, and 1730, in communication with the data processing device 105a, can create a local network 1750 of connected devices.

The data processing device 105b can be configured to collect the sensor data from assets 1735 and 1740. The data processing device 105b can communicate with the assets 1735 and 1740 via a communication channel 250 established between the data processing device 105b and each of the assets 1735 and 1740. The data processing device 105b and the assets 1735 and 1740, in communication with the data processing device 105b, can create a local network 1755 of connected devices.

In an example embodiment, the communication channels 250 between the data processing devices and the assets may include cellular connections such as a 4G connection or a 5G connection.

In an example embodiment, the data processing devices 105, 105a, and 105b can be configured to communicate with each other via communication channels 115. The data processing devices 105, 105a, and 105b can collect the sensor data, aggregate the sensor data, and exchange the aggregated sensor data with each other. The data processing devices 105, 105a, and 105b can be further configured to process the collected sensor data.

In an example embodiment, the data processing devices 105, 105a, and 105b can be configured to transmit the processed sensor data to a central data portal 110 via communication channels 1760. The central data portal 110 may include a common operating platform, which can be installed, for example, on a server. The communication channels 1760 may include, for example, a satellite data communication channel. In further embodiments, the communication channels 1760 may be selected from a cellular data communication channel, a two-way radio data communication channel, Wi-Fi™, Bluetooth™, NFC, Ethernet, ZigBee, microwave, infrared, or other forms of wireless RF or wired data transmission. In some embodiments, all of the data processing devices 105, 105a, and 105b are configured to transmit the processed sensor data to the central data portal 110.

In further embodiments, only some of the data processing devices 105, 105a, and 105b are configured to transmit the processed sensor data to the central data portal 110. In this case, the data processing device that has the communication channel 1760 with the central data portal 110 may collect aggregated processed sensor data from other data processing devices (which are not in communication with the central data portal 110) and transmit the aggregated data collected by each of the data processing devices to the central data portal 110.

In an example embodiment, the local networks 1745, 1750, and 1755 of data processing devices and assets in communication with the data processing devices can be installed in outdoor environments. Example outdoor environments include navy ships, building yards, oil fields, gas fields, mines, and so forth. Inside the local network, the sensor data can be collected from assets by the data processing device (e.g., via a 5G communication) and the collected data can be processed locally within the local network by the data processing device. The processed data may be transmitted outside of the local network (e.g., via a satellite communication).

Figure 18:
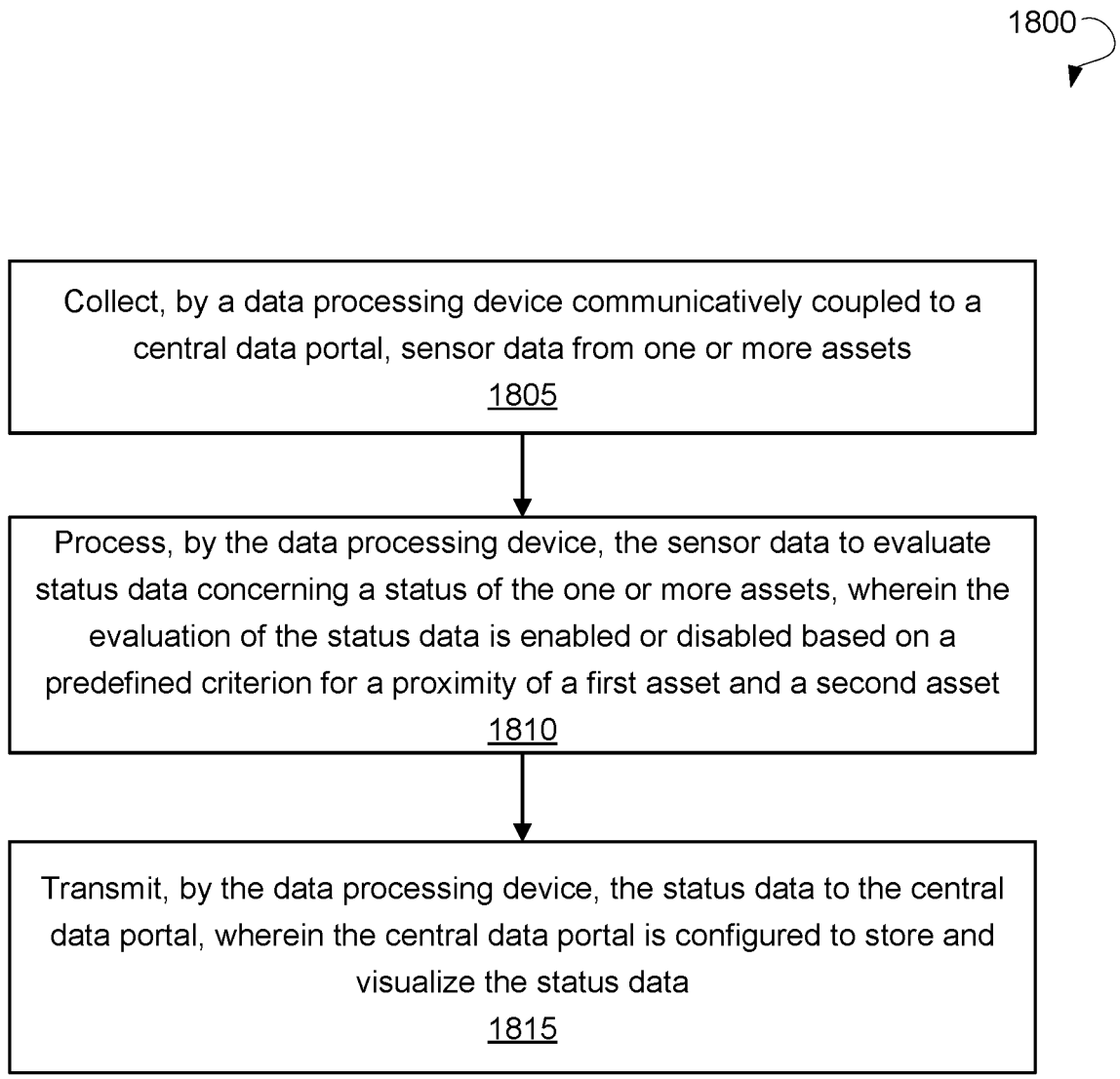
FIG. 18 is a flow chart showing a method for evaluating and transmitting combined external data from one or more assets to a central data portal, according to an example embodiment.

FIG. 18 is flow chart illustrating a method 1800 for evaluation and transmission of combined external data from one or more assets to a central data portal. The method 1800 can be performed in environment 100 shown in FIG. 1 and environments shown in FIGS. 5 and 7-14.

The method 1800 may commence in block 1805 with collecting, by a data processing device communicatively coupled to a central data portal, sensor data from the one or more assets. The method 1800 may proceed with processing, by the data processing device, the sensor data in block 1810 to evaluate status data concerning a status of the one or more assets. The evaluation of the status data may be enabled or disabled based on a predefined criterion for a proximity of a first asset of the one or more assets and a second asset of the one or more assets.

As used herein, a "proximity" of a first asset to a second asset means having a pathway for communication via wired and/or wireless transmission of data between the first asset and the second asset. In an example embodiment, the communication between the first asset and the second asset may include a direct peer-to-peer communication. In some example embodiments, the communication between the first asset and the second asset may include communication of the first asset and the second asset with a central data portal that stores data related to the one or more assets.

In an example embodiment, the predefined criterion may include determination that the first asset and the second asset are within one of the following: a Wi-Fi communication range and a radio communication range. The radio communication range may include a short-wave radio communication range. In an example embodiment, the short-wave radio communication range may include a high frequency band, medium frequency band, low frequency band, and very low frequency band.

In an example embodiment, the radio communication range may be associated with one of the following: a cellular connection, a satellite connection, a Bluetooth™ connection, an ultra-high frequency connection, an NFC, and so forth.

The distance of the proximity of the first asset to the second asset may vary for different connections. For example, for a Bluetooth™ connection, the proximity may include a distance of up to 50 meters. For the cellular connection, the proximity may include a distance of up to 1 mile. For an ultra-high frequency connection, the proximity may include a distance of up to 3 miles. For the wired connection between the first asset and the second asset, the proximity may be equal to a length of a wire between the first asset and the second asset, e.g., 10 meters, 30 meters, 100 meters, and so forth.

In an example embodiment, the predefined criterion may further include determination that the first asset and the second asset are within a visible distance from each other.

In an example embodiment, the evaluation of a status of the first asset of the one or more assets may be partially based on sensor data collected from the second asset of the one or more assets where the second asset is different from the first asset.

The method 1800 may then proceed with transmitting, by the data processing device, the status data to the central data portal in block 1815. The central data portal may be configured to store and visualize the status data.

In an example embodiment, the sensor data may be transmitted between the one or more assets and the data processing device via one or more wired communication channels. In some example embodiments, the sensor data may be transmitted between the one or more assets and the data processing device via one or more wireless communication channels.

In some example embodiments, the method 1800 may further include determining, by the data processing device, based on the sensor data, a relationship between the one or more assets. The relationship may include one or more of the following: a proximity of an asset of the one or more assets to at least one other asset of the one or more assets, position of the asset with respect to the at least one other asset, movement of the asset with respect to the at least one other asset, distance between the asset and the at least one other asset, and so forth.

In an example embodiment, the one or more assets may include one or more of the following: a building, a room, an outdoor location, an indoor location, an outdoor area, a vehicle, an autonomous vehicle, a drone swarm, a person, a wearable device, an electronic device, a facility, and so forth.

In an example embodiment, the one or more assets may include a plurality of autonomous vehicles coordinating with one another in an environment because the autonomous vehicles may be aware of each other's position. Specifically, each autonomous vehicle may have access to the central data portal, provide status data of the autonomous vehicle to the central data portal, and receive status data of other autonomous vehicles and other relevant data from the central data portal.

In an example embodiment, the data processing device may be configured to determine, based on the sensor data, a status associated with the person. The status may concern one or more of the following: a state of panic of the person, an impact imposed on the person, non-responsiveness of the person, a physical orientation of the person, a presence of a gunshot in a proximity of the person, and so forth.

In an example embodiment, the data processing device may be configured to determine, based on the sensor data, a status concerning performance and diagnostics of the vehicle. In some example embodiments, the data processing device may be configured to actuate a state of the vehicle.

Thus, systems and methods for evaluating and transmitting combined external data from one or more assets to a central data portal for processing, storage, and visualization are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for evaluating and transmitting combined external data from one or more assets, the system comprising:
   a central data portal; and
   a data processing device communicatively coupled to the central data portal, the data processing device being configured to:
   collect sensor data from the one or more assets;
   determine, based on the sensor data, that a first asset of the one or more assets and a second asset of the one or more assets are located within a same radio communication range, the same radio communication range being an indication of a proximity of the first asset and the second asset;

process the sensor data to evaluate status data concerning a status of the one or more assets, wherein the evaluation of the status data is enabled or disabled based on a predefined criterion for the proximity of the first asset of the one or more assets and the second asset of the one or more assets; and transmit the status data to the central data portal, wherein the central data portal is configured to store and visualize the status data, wherein the sensor data are transmitted between the one or more assets and the data processing device via one or more wireless communication channels; and a user interface portal communicatively coupled to the central data portal, the user interface portal being configured to provide a user with access to the status data stored on the central data portal for the visualization of the status data on a user device.

2. The system of claim 1, wherein the same radio communication range includes a short-wave radio, Wi-Fi, cellular, satellite, ultra-high frequency (UHF) or very-high frequency (VHF) communication range.

3. The system of claim 1, wherein the predefined criterion further includes determination that the first asset and the second asset are within a visible distance from each other.

4. The system of claim 1, wherein the same radio communication range is associated with one of following: a cellular connection, a satellite connection, a Bluetooth connection, an ultra-high frequency connection, and a near field communication connection.

5. The system of claim 1, wherein the sensor data are transmitted between the one or more assets and the data processing device via one or more wired communication channels.

6. The system of claim 1, wherein the evaluation of a status of the first asset of the one or more assets is partially based on the sensor data collected from the second asset of the one or more assets, the second asset being different from the first asset.

7. The system of claim 1, wherein the data processing device is configured to determine, based on the sensor data, a relationship between the one or more assets.

8. The system of claim 7, wherein the relationship includes one or more of following: a proximity of an asset of the one or more assets to at least one other asset of the one or more assets, a presence of the asset in the at least one other asset, a position of the asset with respect to the at least one other asset, movements of the asset with respect to the at least one other asset, and a distance between the asset and the at least one other asset.

9. The system of claim 1, wherein the one or more assets include one or more of following: a building, a room, an outdoor location, an indoor location, an outdoor area, a vehicle, an autonomous vehicle, a drone swarm, a person, a wearable device, an electronic device, and a facility.

10. The system of claim 9, wherein the data processing device is configured to determine, based on the sensor data, a status associated with the person, wherein the status associated with the person concerns one or more of following: a state of panic of the person, an impact imposed on the person, non-responsiveness of the person, a physical orientation of the person, and a presence of a gunshot in a proximity of the person.

11. The system of claim 9, wherein the data processing device is configured to determine, based on the sensor data, a status concerning performance and diagnostics of the vehicle.

12. The system of claim 9, wherein the data processing device is configured to actuate a state of the vehicle.

13. A method for evaluating and transmitting combined external data from one or more assets, the method comprising:

collecting, by a data processing device communicatively coupled to a central data portal, sensor data from the one or more assets;

determining, by the data processing device, based on the sensor data, that a first asset of the one or more assets and a second asset of the one or more assets are located within a same radio communication range, the same radio communication range being an indication of a proximity of the first asset and the second asset;

processing, by the data processing device, the sensor data to evaluate status data concerning a status of the one or more assets, wherein the evaluation of the status data is enabled or disabled based on a predefined criterion for the proximity of the first asset of the one or more assets and the second asset of the one or more assets; and transmitting, by the data processing device, the status data to the central data portal, wherein the central data portal is configured to store and visualize the status data, wherein the sensor data are transmitted between the one or more assets and the data processing device via one or more wireless communication channels; and a user interface portal communicatively coupled to the central data portal, the user interface portal being configured to provide a user with access to the status data stored on the central data portal for the visualization of the status data on a user device.

14. The method of claim 13, wherein the same radio communication range includes a short-wave radio, Wi-Fi, cellular, satellite, ultra-high frequency (UHF) or very-high frequency (VHF) communication range.

15. The method of claim 13, wherein the predefined criterion further includes determination that the first asset and the second asset are within a visible distance from each other.

16. The method of claim 13, wherein the same radio communication range is associated with one of following: a cellular connection, a satellite connection, a Bluetooth connection, a Wi-Fi connection, a short-wave radio connection, an ultra-high frequency connection, and a near field communication connection.

17. A system for evaluating and transmitting combined external data from one or more assets, the system comprising:

a central data portal;

a data processing device communicatively coupled to the central data portal, the data processing device being configured to:

collect sensor data from the one or more assets;

determine, based on the sensor data, that a first asset of the one or more assets and a second asset of the one or more assets are located within a same radio communication range, the same radio communication range being an indication of a proximity of the first asset and the second asset;

process the sensor data to evaluate status data concerning a status of the one or more assets, wherein:

the evaluation of the status data is enabled or disabled based on a predefined criterion for the proximity of the first asset of the one or more assets and the second asset of the one or more assets; and the predefined criterion includes determination that the first asset and the second asset are within the same radio communication range; and transmit the status data to the central data portal, wherein the central data portal is configured to store and visualize the status data, wherein the sensor data are transmitted between the one or more assets and the data processing device via one or more wireless communication channels; and a user interface portal communicatively coupled to the central data portal, the user interface portal being configured to provide a user with access to the status data stored on the central data portal for the visualization of the status data on a user device.

* * * * *